United States Patent
Fisher et al.

(10) Patent No.: US 9,436,740 B2
(45) Date of Patent: Sep. 6, 2016

(54) VISUALIZATION OF CHANGING CONFIDENCE INTERVALS

(75) Inventors: Danyel A. Fisher, Seattle, WA (US); Arnd Christian König, Kirkland, WA (US); Steven Drucker, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 270 days.

(21) Appl. No.: 13/439,650

(22) Filed: Apr. 4, 2012

(65) Prior Publication Data

US 2013/0265319 A1    Oct. 10, 2013

(51) Int. Cl.
| | |
|---|---|
| *G09G 5/02* | (2006.01) |
| *G06T 11/20* | (2006.01) |
| *G06F 17/30* | (2006.01) |
| *G06T 13/00* | (2011.01) |

(52) U.S. Cl.
CPC ....... *G06F 17/30554* (2013.01); *G06T 11/206* (2013.01); *G06T 13/00* (2013.01)

(58) Field of Classification Search
CPC ..... G06T 11/206; G06T 11/40; G06T 17/00; G06T 11/001; G06T 11/00; G06F 3/04842; G06F 17/30864; G06F 17/30575; G06F 17/30424; G06F 17/30743
USPC .......................... 345/441, 440, 589; 707/723
See application file for complete search history.

(56) References Cited

U.S. PATENT DOCUMENTS

| | | |
|---|---|---|
| 6,503,195 B1 | 1/2003 | Keller et al. |
| 7,182,465 B2 | 2/2007 | Fuchs et al. |
| 7,385,708 B2 | 6/2008 | Ackerman et al. |
| 7,536,396 B2 | 5/2009 | Johnson et al. |
| 7,650,331 B1 | 1/2010 | Dean et al. |
| 7,716,215 B2 | 5/2010 | Lohman et al. |

(Continued)

FOREIGN PATENT DOCUMENTS

| | | |
|---|---|---|
| WO | 2014/011708 A2 | 1/2014 |
| WO | 2014/200877 | 12/2014 |

OTHER PUBLICATIONS

Correa, et al., "A Framework for Uncertainty-Aware Visual Analytics", Retrieved Jan. 11, 2012 at <<http://www.cs.ucdavis.edu/research/tech-reports/2009/CSE-2009-6.pdf>>, Proceedings of IEEE Symposium on Visual Analytics Science and Technology (VAST 2009), pp. 51-58.

(Continued)

*Primary Examiner* — Ke Xiao
*Assistant Examiner* — Nicole Gillespie
(74) *Attorney, Agent, or Firm* — Alin Corie; Sandy Swain; Micky Minhas

(57) ABSTRACT

Incremental query results and confidence interval values associated with respective incremental query results may be obtained. Visualization shape objects indicating uncertainty values may be determined, based on mapping values of respective incremental query results and confidence interval values to points in the associated visualization shape objects, the uncertainty values visualized based on proportional shapes of the visualization shape objects. At least one visualization comparison object representing a comparison of a plurality of distributions associated with the obtained incremental query results and confidence interval values may be determined. Display of the plurality of visualization shape objects and the at least one visualization comparison object may be initiated.

20 Claims, 19 Drawing Sheets

(56) References Cited

U.S. PATENT DOCUMENTS

| | | | |
|---|---|---|---|
| 7,728,868 B2 | 6/2010 | Razzaque et al. | |
| 7,877,381 B2 | 1/2011 | Ewen et al. | |
| 7,882,138 B1 | 2/2011 | Kumar | |
| 7,890,444 B2 | 2/2011 | Torres et al. | |
| 8,032,554 B2 | 10/2011 | Nishizawa et al. | |
| 8,090,730 B2 | 1/2012 | Shahabi et al. | |
| 8,572,068 B2 | 10/2013 | Graefe et al. | |
| 8,959,651 B2 | 2/2015 | Li et al. | |
| 8,983,936 B2 | 3/2015 | Fisher et al. | |
| 2006/0031209 A1 | 2/2006 | Ahlberg et al. | |
| 2006/0106793 A1 | 5/2006 | Liang | |
| 2007/0016612 A1 | 1/2007 | James et al. | |
| 2007/0226178 A1 | 9/2007 | Ewen et al. | |
| 2008/0072180 A1 | 3/2008 | Chevalier et al. | |
| 2008/0077530 A1 | 3/2008 | Banas et al. | |
| 2008/0250357 A1 | 10/2008 | Lee et al. | |
| 2008/0306919 A1 | 12/2008 | Iwayama et al. | |
| 2009/0228434 A1 | 9/2009 | Krishnamurthy et al. | |
| 2009/0252404 A1 | 10/2009 | Lecerf | |
| 2009/0322754 A1* | 12/2009 | Robertson et al. | 345/440 |
| 2009/0322756 A1* | 12/2009 | Robertson et al. | 345/440 |
| 2010/0225661 A1 | 9/2010 | Gorisch et al. | |
| 2010/0241646 A1 | 9/2010 | Friedman et al. | |
| 2010/0268067 A1 | 10/2010 | Razzaque et al. | |
| 2011/0047120 A1 | 2/2011 | Kamvar et al. | |
| 2011/0084967 A1 | 4/2011 | De Pauw et al. | |
| 2011/0167110 A1 | 7/2011 | Hoffberg et al. | |
| 2011/0258183 A1 | 10/2011 | Gibbs et al. | |
| 2011/0302164 A1 | 12/2011 | Krishnamurthy et al. | |
| 2011/0310112 A1* | 12/2011 | Zolotovitski | 345/589 |
| 2011/0314021 A1 | 12/2011 | Gibbs et al. | |
| 2012/0047125 A1 | 2/2012 | Day et al. | |
| 2012/0054173 A1 | 3/2012 | Andrade et al. | |
| 2012/0078939 A1 | 3/2012 | Chen et al. | |
| 2012/0089642 A1 | 4/2012 | Milward et al. | |
| 2012/0158708 A1 | 6/2012 | Gillet et al. | |
| 2012/0311581 A1 | 12/2012 | Balmin et al. | |
| 2013/0030860 A1 | 1/2013 | Chaubey et al. | |
| 2013/0046756 A1* | 2/2013 | Hao et al. | 707/723 |
| 2013/0117257 A1 | 5/2013 | Meijer et al. | |
| 2013/0124097 A1 | 5/2013 | Thorne | |
| 2013/0194271 A1* | 8/2013 | Roesch et al. | 345/440 |
| 2014/0082178 A1 | 3/2014 | Boldyrev et al. | |
| 2014/0372438 A1 | 12/2014 | Chandramouli et al. | |

OTHER PUBLICATIONS

"Uncertainty Visualization", Retrieved Jan. 11, 2012 at <<http://spatial-analyst.net/wiki/index.php?title=Uncertainty_visualization>>, 11 pages.

Fisher et al., "Trust Me, I'm Partially Right: Incremental Visualization Lets Analysts Explore Large Datasets Faster," Available Apr. 4, 2012 at <<http://eprints.soton.ac.uk/273149/1/chi2012_interactive.pdf>>, In: CHI 2012, May 5-12, 2012, Austin, Texas, 10 pages.

Fisher, D., "Incremental, Approximate Database Queries and Uncertainty for Exploratory Visualization", Retrieved Apr. 4, 2012 at <<http://research.microsoft.com/pubs/153555/fisher.pdf>>, Proceedings of IEEE Symposium on Large-Scale Data Analysis and Visualization (LDAV) 2011, 8 pages.

Hellerstein, et al., "Interactive Data Analysis: The Control Project", Retrieved Jan. 11, 2012 at <<http://ieeexplore.ieee.org/stamp/stamp.jsp?tp=&arnumber=781635>>, IEEE Computer, vol. 32, Issue 8 (1999), pp. 51-59.

Jermaine et al., "The Sort-Merge-Shrink Join", Apr. 4, 2012 at <<http://www.cise.ufl.edu/~apol/i/smstods.pdf>>, ACM Transactions on Database Systems 31(4) (2006), pp. 1382-1416.

Kim et al., "Selecting the Best System: Theory and Methods", Retrieved Apr. 4, 2012 at <<http://informs-sim.org/wsc03papers/013.pdf>>, In Proceedings of the 2003 Winter Simulation Conference, vol. 1 (2003), pp. 101-112.

Maurer, et al., "Empirical Bernstein Bounds and Sample Variance Penalization", Retrieved Apr. 4, 2012 at <<http://www.andreas-maurer.eu/svp-final.pdf>>, In Proceedings of the Twenty-Second Annual Conference on Learning Theory, 7 (2009), 9 pages.

Olston, et al., "Visualizing data with bounded uncertainty", Retrieved Jan. 11, 2012 at <<http://citeseerx.ist.psu.edu/viewdoc/download;jsessionid=63116511EA05D5D85C39987FEC5DCACE?doi=10.1.1.1.8227&rep=rep1&type=pdf>>, In Proceedings of IEEE Symposium on Information Visualization (2002), 8 pages.

Sanyal, et al., "A User Study to Compare Four Uncertainty Visualization Methods for 1D and 2D Datasets", Retrieved Jan. 11, 2012 at <<http://ieeexplore.ieee.org/stamp/stamp.jsp?tp=&arnumber=5290731>>, IEEE Transactions on Visualization and Computer Graphics 15(6) (2009), pp. 1209-1218.

Streit, et al., "A Spreadsheet Approach to Facilitate Visualization of Uncertainty in Information", Retrieved Jan. 11, 2012 at <<http://ieeexplore.ieee.org/stamp/stamp.jsp?tp=&arnumber=4359495>>, IEEE Transactions on Visualization and Computer Graphics 14(1) (2008), pp. 61-72.

Wickham, et al., "40 Years of Boxplots", Retrieved Apr. 4, 2012 at <<http://vita.had.co.nz/papers/boxplots.pdf>>, Nov. 29, 2011, 17 pages.

Jackson, C.H., "Displaying Uncertainty With Shading", The American Statistician, vol. 62, No. 4 (Nov. 2008), 8 pages.

Esty, et al., "The Box-Percentile Plot", Retrieved Feb. 14, 2012 at <<http://www.jstatsoft.org/v08/i17/paper>>, Journal of Statistical Software, 8(17), (2003), pp. 1-14.

Kampstra, P., "Beanplot: A Boxplot Alternative for Visual Comparison of Distributions", Retrieved Feb. 14, 2012 at <<http://www.jstatsoft.org/v28/c01/paper>>, Journal of Statistical Software, Code Snippets, 28(1), (2008), pp. 1-9.

Slezak, et al., "Towards Approximate SQL: Infobright's Approach", In Proceedings of the 7th International Conference on Rough Sets and Current Trends in Computing (RSCTC'10), (2010), pp. 630-639.

"Airline On-Time Performance and Causes of Flight Delays", Retrieved Apr. 4, 2012 at <<http://explore.data.gov/d/ar4r-an9z>>, 1 page.

Piringer et al.; "A Multi-Threading Architecture to Support Interactive Visual Exploration"; In IEEE Transactions on Visualization and Computer Graphics (2009), vol. 15, Issue: 6, Publisher: IEEE, pp. 1113-1120 Nov.-Dec.; published via Internet on Oct. 11, 2009.

Cottam et al.; "Bit by Bit: Incremental Data Visualization", Published Oct. 19, 2008 via Internet; IEEE Symposium on Information Visualization, 2009; Retrieved from "http://www.cs.indiana.edu/.about.jcottam/pubs/InfoVis09-BitByBit.pdf" on Apr. 1, 2012.

Garrett et al.; "Real-Time Incremental Visualization of Dynamic Ultrasound vols. Using Parallel Bsp Trees"; Department of Computer Science, University of North Carolina at Chapel Hill; Published in IEEE Visualization '96 Proceedings held Oct. 27-No. 1, 1996, pp. 235-240; downloaded from "http://www.cs.unc.edu/.about.whitton/ExtendedCV/Papers/1996-Viz-Garrett.-pdf" on Apr. 1, 2012.

Deligiannidis et al.;"User-Centered Incremental Data Exploration and Visualization"; LSDIS Lab and Computer Science, The University of Georgia; Published Year: 2008; Downloaded from "http://lsdis.cs.uga.edu/projects/semvis/PGV/PGV.pdf" on Apr. 1, 2012.

Office Action mailed May 14, 2013 for Fisher et al., U.S. Appl. No. 13/439,563, entitled "Incremental Visualization for Structured Data in an Enterprise-level Data Store,"filed Apr. 4, 2012, 7 pages.

Response filed Sep. 12, 2013 in response to Office Action mailed May 14, 2013 for Fisher et al., U.S. Appl. No. 13/439,563, entitled "Incremental Visualization for Structured Data in an Enterprise-level Data Store," filed Apr. 4, 2012, 9 pages.

Office Action mailed Nov. 1, 2013 for Fisher et al., U.S. Appl. No. 13/439,563, entitled "Incremental Visualization for Structured Data in an Enterprise-level Data Store," filed Apr. 4, 2012, 8 pages.

Response filed Feb. 3, 2014 in response to Office Action mailed Nov. 1, 2013 for Fisher et al., U.S. Appl. No. 13/439,563, entitled "Incremental Visualization for Structured Data in an Enterprise-level Data Store," filed Apr. 4, 2012, 10 pages.

Office Action mailed May 9, 2014 for Fisher et al., U.S. Appl. No. 13/439,563, entitled "Incremental Visualization for Structured Data in an Enterprise-level Data Store," filed Apr. 4, 2012, 10 pages.

(56) References Cited

OTHER PUBLICATIONS

Response filed Aug. 11, 2014 in response to Office Action mailed May 9, 2014 for Fisher et al., U.S. Appl. No. 13/439,563, entitled "Incremental Visualization for Structured Data in an Enterprise-level Data Store," filed Apr. 4, 2012, 9 pages.
Notice of Allowance mailed Oct. 28, 2014 for Fisher et al., U.S. Appl. No . 13/439,563, entitled "Incremental Visualization for Structured Data in an Enterprise-level Data Store," filed Apr. 4, 2012, 9 pages.
Fisher et al., "Exploratory Visualization Involving Incremental, Approximate Database Queries and Uncertainty," IEEE Computer Graphics and Applications, vol. 32, Issue 4, Jul. 2012, pp. 55-62.
"International Preliminary Report on Patentability," from PCT Patent Application No. PCT/US2013/049820, Mailed Feb. 19, 2015, 17 pages.
"International Search Report," from PCT Patent Application No. PCT/US2013/049820, Mailed May 26, 2014, 5 pages.
Fisher, et al., "Progressive Query Computation Using Streaming Architectures," U.S. Appl. No. 13/723,224, filed Dec. 21, 2012, 53 pages.
Luo, et al., "Query Merging for Data Processing in the Cloud", Retrieved Feb. 20, 2013 at <<http://www.cs.duke.edu/~fanyang/296_final_report.pdf>>, final report on project at Duke University, retrieved online Feb. 20, 2013, 5 Pages.
Bain, Dr. William., "Using In-Memory Computing to Simplify Big Data Analytics", Retrieved Feb. 20, 2013 at <<http://www.datanami.com/datanami/2012-10-12/using_using in-memory_computing_to_simplify_big_data_analytics.html>>, Datanami, Oct. 2, 2012, 5 Pages.
Gilbert, George., "Real-time Query for Hadoop Democratizes Access to Big Data Analytics", Retrieved Feb. 20, 2013 at <<http://www.cloudera.com/content/dam/cloudera/Resources/PDF/GigaOM_Cloudera_Real-time_query_for_Hadoop_democratizes_access_to_big_data_analytics.pdf>>, Giga Omni Media, Inc., Pct. 22, 2012, 18 Pages.
Gift, Noah., "Solve Cloud-Related Big Data Problems with MapReduce", Retrieved Feb. 20, 2013 at http://www.ibm.com/developerworks/cloud/library/cl-bigdata/?cmp=dw&dpb=dwcld&ct=dwnew&cr=dwnen&ccy=zz&csr=111810>>, IBM DeveloperWorks, Nov. 8, 2010, 6 Pages.
Harris, Derick., "Cloudera makes SQL a first-class citizen in Hadoop", Retrieved Feb. 20, 2013 at <<http://gigaom.com/2012/10/24/cloudera-makes-sql-a-first-class-citizen-in-hadoop/>>, GIGAOM, Oct. 24, 2012, 5 Pages.
"Process Progress Dialog Box (Analysis Services—Multidimensional Data)", Retrieved Feb. 20, 2013 at <<http://technet.microsoft.com/en-us/library/ms190131(v=sql.105).aspx>>, Microsoft, 2 Pages.
Sato, Kazunori., "An Inside Look at Google BigQuery", Retrieved Feb. 20, 2013 at <<https://cloud.google.com/files/BigQueryTechnicalWP.pdf>>, Google, Inc., Retrieved online Feb. 20, 2013, 12 Pages.
Diao, Yanlei., "Scalable, Low-Latency Data Analytics and its Applications", Retrieved Feb. 20, 2013 at <<http://www.comp.hkbu.edu/hk/v1/file/seminar/20120117_Diao-2012public.pdf>>, University of Massachusetts Amherst, Retrieved online Feb. 20, 2013, 29 Pages.
Abadi, et al., "The Design of the Borealis Stream Processing Engine", Retrieved Feb. 20, 2013 at <<http://www.cs.harvard.edu/~mdw/course/cs260r/papers/borealis-cidr05.pdf>>, In Proceedings of the Second Biennial Conference on Innovative Data Systems Research (CIDR), Jan. 2005, 13 pages.
Ali, et al., "Microsoft CEP Server and Online Behavioral Targeting", Retrieved Feb. 20, 2013 at <<http://research.microsoft.com/pubs1101568/MicrosoftCEPDemo.pdf>>, In Journal of Proceedings of the Very Large Database Endowment (VLDB '09), vol. 2, Issue 2, Aug. 24, 2009, 4 pages.
Babcock, et al., "Models and Issues in Data Stream Systems", Retrieved Feb. 20, 2013 at <<http://infolab.usc.edu/csci599/Fall2002/paper/DML2_streams-issues.pdf>>, In Proceedings of the Twenty-First ACM SIGMOD-SIGACT-SIGART Symposium on Principles of Database Systems (PODS '02), Jun. 3, 2002, 30 Pages.
Barga, at al., "Iterative MapReduce Research on Azure", Retrieved Feb. 25, 2013 at <<http://research.microsoft.com/en-us/people/barga/sc11daytona.pdf>>, International Conference for High Performance Computing, Networking, Storage and Analysis (SC 11), Nov. 12, 2011, 1 Page.
Barga, at al., "Consistent Streaming Through Time: A Vision for Event Stream Processing", Retrieved Feb. 20, 2013 at <<http://arxiv.org/ftp/cs/papers/0612/0612115.pdf>>, In 3rd Biennial Conference on Innovative Data Systems Research (CIDR), Jan. 7, 2007, 12 Pages.
Chandramouli, et al., "Temporal Analytics on Big Data for Web Advertising", Retrieved Feb. 21, 2013 at <<http://ieeexplore.ieee.org/stamp/stamp.jsp?tp=&arnumber=6228075>>, In IEEE 28th International Conference on Data Engineering, Apr. 1, 2012, pp. 90-101.
Chaudhuri, et al., "Effective Use of Block-Level Sampling in Statistics Estimation", Retrieved Feb. 22, 2013 at <<http://infolab.stanford.edu/~usriv/papers/bls.pdf>>, In Proceedings of the ACM SIGMOD International Conference on Management of Data, Jun. 13, 2004, 12 Pages.
Condie, et al., "MapReduce Online", Retrieved Feb. 22, 2013 at <<http://db.cs.berkeley.edu/papers/nsdi10-hop.pdf>>, In Proceedings of the 7th USENIX Conference on Networked Systems Design and Implementation (NSDI'10), Apr. 28, 2010, 15 Pages.
"Daytona: Iterative MapReduce on Windows Azure", Retrieved Sep. 19, 2013 at <<http://research.microsoft.com/en-us/projects/daytona/>>, Microsoft Research, retrieved online Sep. 19, 2013, 4 pages.
Dean, et al., "MapReduce: Simplified Data Processing on Large Clusters", Retrieved Feb. 22, 2013 at <<http://.static.usenix.org/event/osdi04/tech/full_papers/dean/dean.pdf>>, In Proceedings of 6th Symposium on Operating Systems Design and Implementation (OSDI '04), Dec. 6, 2004, pp. 137-149.
Doucet, et al., "Efficient Block Sampling Strategies for Sequential Monte Carlo Methods", Retrieved Feb. 22, 2013 at <<http://www.cs.ubc.ca/~arnaud/almostfinalversionjcgs.pdf>>, In Journal of Computational and Graphical Statistics, vol. 15, Issue 3, Sep. 2006, 19 Pages.
Grover, et al., "Extending Map-Reduce for Efficient Predicate-Based Sampling", Retrieved Feb. 22, 2013 at <<http://ieeexplore.ieee.org/stamp/stamp.jsp?tp=&arnumber=6228108>>, In IEEE 28th International Conference on Data Engineering, Apr. 1, 2012, pp. 486-497.
Haas, et al., "Ripple Joins for Online Aggregation", Retrieved Feb. 22, 2013 at <<http://static.cs.brown.edu/courses/cs227/archives/2008/Papers/QueryEval/HaasHellerstein.pdf>>, In Proceedings of the ACM SIGMOD International Conference on Management of Data (SIGMOD '99), Jun. 1, 1999, pp. 287-298.
Haas, et al., "Join Algorithms for Online Aggregation", Retrieved Feb. 22, 2013 at http://citeseerx.ist.psu.edu/viewdoc/download;jsessionid=881BEE78081A02A8EA962993C3F54E2B?doi=10.1.1.55.9766&rep=rep1&type=pdf>>, IBM Research Report RJ 10126 (95001), IBM Almaden Research, Jun. 30, 1998, 42 Pages.
Hall, et al., "Processing a Trillion Cells Per Mouse Click", Retrieved Feb. 22, 2013 at <<http://vldb.org/pvldb/vol5/p1436_alexanderhall_bldb2012.pdf>>, In Proceedings of the VLDB Endowment, vol. 5, No. 11, Aug. 27, 2012, pp. 1436-1446.
Hammad, et al., "Nile: A Query Processing Engine for Data Streams", Retrieved Feb. 22, 2013 at <<http://.ieeexplore.ieee.org/stamp/stamp.jsp?tp=&arnumber=1320080>>, In Proceedings of the 20th International Conference on Data Engineering (ICDE'04), Mar. 30, 2004, 1 Page.
Hellerstein, et al., "Informix Under Control: Online Query Processing", Retrieved Feb. 22, 2013 at <<http://www.cs.du.edu/~leut/4423/papers/controlInformix.pdf>>, In Journal of Data Mining and Knowledge Discovery, vol. 4, Issue 4, Oct. 2000, pp. 281-314.
Hellerstein, et al., "Online Aggregation", Retrieved Feb. 22, 2013 at <<https://www.cs.duke.edu/courses/spring03/cps216/papers/hel-

(56) References Cited

OTHER PUBLICATIONS lerstein-etal-1997.pdf>>, In Proceedings of the ACM SIGMOD International Conference on Management of Data, May 13, 1997, 12 Pages.

Jensen, et al., "Temporal Specialization", Retrieved Feb. 22, 2013 at <<http://ieeexplore.ieee.org/stamp/stamp.jsp?tp=&arnumber=213149>>, In Proceedings of the Eighth International Conference on Data Engineering, Feb. 2, 1992, pp. 594-603.

Jermaine, et al., "Scalable Approximate Query Processing with the DBO Engine", Retrieved Feb. 22, 2013 at <<http://citeseerx.ist.psu.edu/viewdoc/download?doi=10.1.1.79.9444&rep=rep1&type=pdf>>, In Proceedings of the ACM SIGMOD International Conference on Management of Data (SIGMOD '07), Jun. 12, 2007, pp. 725-736.

Laptev, et al., "Early Accurate Results for Advanced Analytics on MapReduce", Retrieved Feb. 22, 2013 at <<http://arxiv.org/pdf/1207.0142v1.pdf>>, In Proceedings of the VLDB Endowment, vol. 5, No. 10, Aug. 27, 2012, pp. 1028-1039.

Li, et al., "A Platform for Scalable One-Pass Analytics Using MapReduce", Retrieved Feb. 22, 2013 at <<http://people.cs.umass.edu/~mcgregor/papers/11-sigmod.pdf>>, In Proceedings of the ACM SIGMOD International Conference on Management of Data (SIGMOD '11), Jun. 12, 2011, 12 Pages.

Melnik, et al., "Dremel: Interactive Analysis of Web-Scale Datasets", Retrieved Feb. 22, 2013 at <<http://static.googleusercontent.com/external_content/untrusted_dlcp/research.google.com/en//pubs/archive/36632.pdf, 36th International Conference on Very Large Data Bases, Proceedings of the VLDB Endowment, vol. 3, No. 1, Sep. 13, 2010, 10 Pages.

Pansare, et al., "Online Aggregation for Large MapReduce Jobs", International Conference on Very large Data Bases (VLDB '11), vol. 4, Issue 11, Aug. 29, 2011, 11 Pages.

Raman, et al., "Online Dynamic Reordering for Interactive Data Processing", Retrieved Feb. 22, 2013 at <<http://www.eecs.berkeley.edu/Pubs/TechRpts/1999/CSD-99/1043.pdf>>, In Proceedings of the 25th International Conference on Very Large Data Bases (VLDB '99 ), Sep. 7, 1999, 19 Pages.

Rowstron, et al., "Nobody Ever Got Fired for Using Hadoop on a Cluster", Retrieved Feb. 22, 2013 at <<http://research.microsoft.com/en-us/um/people/antr/Publications/hotcbp12%20%final.pdf>>, In Proceedings of the 1st International Workshop on Hot Topics in Cloud Data Processing (HotCDP 2012), Article No. 2, Apr. 10, 2012, 5 Pages.

Ryvkina, et al., "Revision Processing in a Stream Processing Engine: A High-Level Design", Retrieved Feb. 22, 2013 at http://ieeexplore.ieee.org/stamp/stamp.jsp?tp=&arnumber=1617509>>, In Proceedings of the 22nd International Conference on Data Engineering (ICDE'06), Apr. 3, 2006, 3 Pages.

"LINQ (Language-Integrated Query)", Retrieved Feb. 22, 2013 at <<http://msdn.microsoft.com/en-us/library/vstudio/bb397926.aspx>>, Microsoft, retrieved online Feb. 22, 2013, 1 Page.

Upadhyaya, et al., "A Latency and Fault-Tolerance Optimizer for Online Parallel Query Plans", Retrieved Feb. 22, 2013 at <<http://homes.cs.washington.edu/~magda/papers/upadhyaya-sigmod11.pdf>>, In Proceedings of the ACM SIGMOD International Conference on Management of Data (SIGMOD'11), Jun. 12, 2011, 12 Pages.

White, Tom., "Hadoop: The Definitive Guide", Retrieved Feb. 25, 2013 at <<http://faculty.qu.edu.qa/malmeer/506499/OReilly.Hadoop.The.Definitive.Guide.Jun.2009.pdf>>, In O'Reilly, Yahoo! Press, 2009, 525 Pages.

Zaharia, et al., "Resilient Distributed Datasets: A Fault-Tolerant Abstraction for In-Memory Cluster Computing", In Proceedings of the 9th USENIX Conference on Networked Systems Design and Implementation (NSDI'12), Apr. 25, 2012, 14 Pages.

Fisher, et al., "Progressive Query Computation Using Streaming Architectures", U.S. Appl. No. 13/723,224, Filing Date: Dec. 21, 2012, 53 pages.

Chandramouli, et al., "Scalable Progressive Analytics on Big Data in the Cloud," Retrieved Sep. 20, 2013 at <<http://research.microsoft.com/pubs/2001691now-vldb.pdf>>, Proceedings of the VLDB Endowment, vol. 6, No. 14, 39th International Conference on Very Large Data Bases, Aug. 26, 2013, 12 pages.

Office Action mailed Mar. 12, 2015 for Chandramouli et al., U.S. Appl. No. 13/915,632, entitled "Deterministic Progressive Big Data Analytics," filed Jun. 12, 2013, 10 pages.

"International Search Report and Written Opinion" Issued in PCT Application No. PCT/US2014/041450, Mailed Date: Nov. 25, 2014, inventors Chandramouli et al., entitled "Deterministic Progressive Big Data Analytics," filed Jun. 9, 2014, 14 pages.

Michael, et al., "Simple, Fast, and Practical Non-Blocking and Blocking Concurrent Queue Algorithms", In Proceedings of the Fifteenth Annual ACM Symposium on Principles of Distributed Computing, May 23, 1996, 9 Pages.

Bose, et al., "Beyond Online Aggregation: Parallel and Incremental Data Mining with Online Map-Reduce", In Proceedings of the Workshop on Massive Data Analytics on the Cloud, Apr. 26, 2010, 6 Pages.

* cited by examiner

200b (2A)

---
| Determine incremental groups of the plurality of incremental query results | 210
| and associated confidence interval values, based on a plurality of temporal
| intervals associated with incremental convergence of the plurality of
| incremental query results ---
| Determine incremental sets of the visualization shape objects indicating | 212
| uncertainty values, based on mapping values of respective ones of the
| incremental groups to points in the associated ones of the incremental sets,
| the uncertainty values visualized based on proportional shapes of the
| visualization shape objects ---
| Determine incremental instances of the at least one visualization comparison | 214
| object representing the comparison of the plurality of distributions associated
| with the obtained incremental query results and confidence interval values,
| based on the incremental sets ---
| Initiate incremental display of the incremental sets of the plurality of | 216
| incremental query results, based on the plurality of temporal intervals
| associated with the incremental convergence of the plurality of incremental
| query results (2B)

---
| Determine shaded gradient visualization fill associated with the visualization | 218
| shape objects, the shaded gradient visualization fill indicating the uncertainty
| values, based on mapping values of respective ones of the incremental query
| results and confidence interval values to points in the associated ones of the
| visualization shape objects

220 — Determine shaded gradient visualization fill associated with the visualization shape objects, the shaded gradient visualization fill including a progressively darker gradient fill as points in respective regions converge to final values 222 — Determine the at least one visualization comparison object based on determining one or more probabilities that a first distribution final value is higher than a second distribution final value 224 — The at least one visualization comparison object includes one or more of a pie chart representing a comparison of a plurality of distributions associated with the obtained incremental query results and confidence interval values, or a bar chart representing a comparison of a plurality of distributions associated with the obtained incremental query results and confidence interval values 226 — Determine a plurality of graphic bars indicating locations of confidence interval bounds associated with the obtained confidence interval values, based on mapping the graphic bars to points in the respective visualization shape objects associated with the respective obtained confidence interval values 228 — The visualization shape objects include rectangular visualization shape objects that include modulated levels of colored fill and a plurality of graphic bars indicating locations of confidence interval bounds associated with the obtained confidence interval values, based on mapping the graphic bars to points in the respective visualization shape objects associated with the respective obtained confidence interval values

FIG. 2c

200d

230 — The visualization shape objects include one or more of rectangular visualization shape objects that include modulated levels of a first color fill on a second color, or tapered visualization shape objects that include tapered widths proportional to respective probabilities associated with the obtained confidence interval values 232 — The respective probabilities associated with the obtained confidence interval values represent probabilities that respective points included in the visualization shape objects include actual final values of query results 234 — The plurality of distributions associated with the obtained incremental query results are associated with respective cumulative density functions 236 — The tapered visualization shape objects include one or more of tapered widths proportional to respective probabilities associated with the obtained confidence interval values, with a single color fill, tapered widths proportional to respective probabilities associated with the obtained confidence interval values, with progressively lighter color fill extending from respective midpoints of the tapered visualization shape objects toward endpoints of the tapered visualization shape objects, tapered widths proportional to respective probabilities associated with the obtained confidence interval values, with progressively darker color fill extending from respective midpoints of the tapered visualization shape objects toward endpoints of the tapered visualization shape objects, tapered widths proportional to respective probabilities associated with the obtained confidence interval values, with annotated graphic bars indicating locations of confidence interval bounds associated with the obtained confidence interval values, the annotated graphic bars including widths associated with the tapered widths of the tapered visualization shape objects, at the respective locations of the confidence interval bounds, or tapered widths proportional to respective probabilities associated with the obtained confidence interval values, with shaded gradient color fill

- - - - - - - - - - - - - - - - - - - - - - - - - - - - 410
| Determine the at least one visualization comparison object based on
| determining one or more probabilities that a first distribution final value is
| higher than a second distribution final value (4B)
↓

- - - - - - - - - - - - - - - - - - - - - - - - - - - - 412
| Determine incremental groups of the plurality of incremental query results
| and associated confidence interval values, based on a plurality of temporal
| intervals associated with incremental convergence of the plurality of
| incremental query results

↓

- - - - - - - - - - - - - - - - - - - - - - - - - - - - 414
| Determine incremental instances of the at least one visualization comparison
| object representing the comparison of the plurality of distributions associated
| with the obtained incremental query results and confidence interval values,
| based on the incremental sets

↓

- - - - - - - - - - - - - - - - - - - - - - - - - - - - 416
| Initiate incremental display of the incremental instances of the at least one
| visualization comparison object

FIG. 4b

VISUALIZATION OF CHANGING CONFIDENCE INTERVALS

BACKGROUND

Users of electronic devices are increasingly relying on information obtained from electronic processing as sources of research results, news reports, ratings, item descriptions, announcements, event information, and other various types of information that may be of interest to the users. Further, users are increasingly relying on electronic devices to process very large datasets for various tasks. For example, a researcher may be tasked with a large data analysis problem, and may carefully check his/her program code before submitting the code to a processing queue, in hopes of receiving results the next day. The next day, he/she may discover that their job submission resulted in a fatal error code, or that one or more different queries may have addressed his/her question(s) more usefully.

SUMMARY

According to one general aspect, a system may include a result acquisition component that obtains a plurality of incremental query results and a plurality of confidence interval values associated with respective ones of the incremental query results. The system may also include a visualization object determination component that determines a plurality of visualization shape objects indicating uncertainty values, based on mapping values of respective ones of the incremental query results and confidence interval values to points in the associated ones of the visualization shape objects, the uncertainty values visualized based on proportional shapes of the visualization shape objects. The system may also include a visualization comparison component that determines at least one visualization comparison object representing a comparison of a plurality of distributions associated with the obtained incremental query results and confidence interval values. The system may also include a visualization object output component that initiates display of the plurality of visualization shape objects and the at least one visualization comparison object.

According to another aspect, a plurality of incremental query results and a plurality of confidence interval values associated with respective ones of the incremental query results may be obtained. Incremental groups of the plurality of incremental query results and associated confidence interval values may be determined, based on a plurality of temporal intervals associated with incremental convergence of the plurality of incremental query results. Incremental sets of visualization shape objects indicating uncertainty values may be determined, based on mapping values of respective ones of the incremental groups to points in the associated ones of the incremental sets, the uncertainty values visualized based on proportional shapes of the visualization shape objects.

According to another aspect, a computer program product tangibly embodied on a computer-readable storage medium may include executable code that may cause at least one data processing apparatus to obtain a plurality of incremental query results and a plurality of confidence interval values associated with respective ones of the incremental query results. Further, the at least one data processing apparatus may determine at least one visualization comparison object representing a comparison of a plurality of distributions associated with the obtained incremental query results and confidence interval values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

Figure 1:
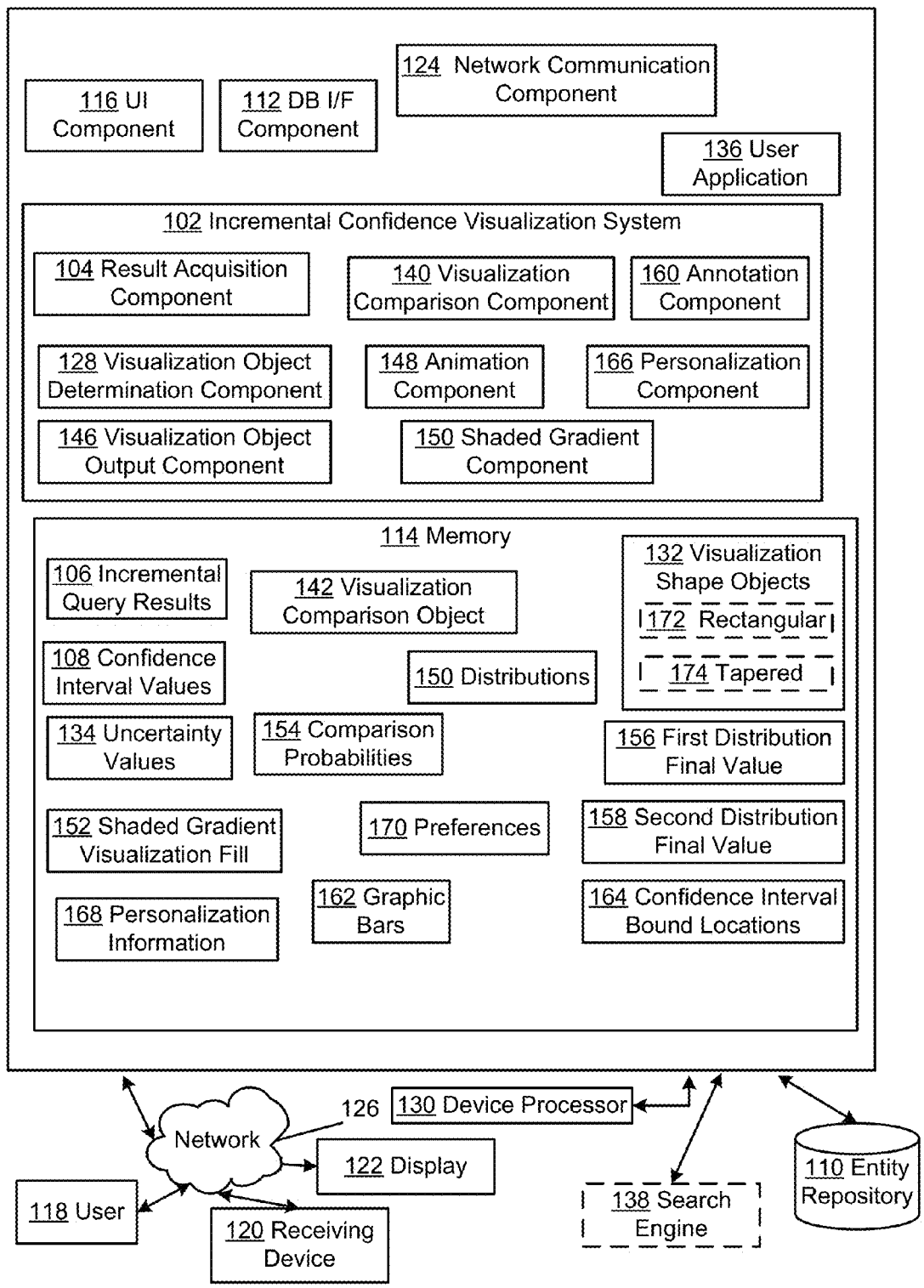
FIG. 1 is a block diagram of an example system for incremental confidence visualization.

In a context of very large datasets (e.g. hundreds of terabytes), data processing such as aggregate data queries may consume so much processing time that response times do not easily provide user interactivity. For example, data may be generated from simulations, collected from click logs, and gathered from thousands of devices sensing and recording their environment. Many users may desire online query processing to try to obtain faster, more relevant results. For example, incremental queries may operate on progressively large samples from a database. Visualizations may be updated to indicate the latest results, and may be annotated to indicate expected confidence intervals.

Example techniques discussed herein may provide confidence interval visualizations which may include various indicators of confidence. For example, the confidence interval visualizations may have a tapered shape, a gradient color, and/or small "ribs", all of which may be used to indicate relative uncertainty.

Example techniques discussed herein may provide animated incremental confidence interval visualizations over temporal intervals.

Example techniques discussed herein may provide distribution comparison charts for visually comparing two (or more) distributions. For example, the distribution comparison charts may provide a visual estimate of the odds (e.g., probabilities) that one value will be higher than the other.

Example techniques discussed herein may provide estimations of probabilities that one bar will be bigger than another, and may provide a pie chart or bar chart to indicate comparison results.

Example techniques discussed herein may provide a comparison visualization that compares which value is likely to be highest in an aggregate query.

Example techniques discussed herein may provide visualizations that may include shaded gradients that do not turn completely black to indicate uncertainty.

Example techniques discussed herein may provide visualizations based on shapes to indicate uncertainty.

Example techniques discussed herein may provide alternative visualizations that show different aspects of approximate queries.

In this context, an "incremental query" may include a request or query in which a device (e.g., a server, desktop, special purpose hardware device, mobile device) may generate a part of an answer, then a larger part of an answer (e.g., a more complete part of an answer), and so on, until it produces a complete answer or response. The solution that is returned may thus include a result with a confidence interval (or results with respective confidence intervals). As the processing progresses, the confidence intervals may progressively shrink until the processing converges on a final value.

In this context, a "confidence interval" may refer to a range of values that is likely to include a final response or answer. For example, a reason for taking a random sample from a lot or population and computing a statistic, such as the mean, from the data, may include attempting to approximate the mean of the population. How well the sample statistic estimates the underlying population value may be a relevant issue for a user such as a researcher. A confidence interval may address this issue by providing a range of values that is likely to include the population parameter of interest.

For example, confidence intervals may be constructed at a confidence level, such as 95%, selected by a user. Thus, if the same population is sampled on numerous occasions and interval estimates are made on each occasion, the resulting intervals may bracket the true population parameter in approximately 95% of the cases. A confidence stated at a 1-α level may be referred to as an inverse of a significance level, α.

As further discussed herein, FIG. 1 is a block diagram of a system 100 for example incremental confidence visualization operations. As shown in FIG. 1, a system 100 may include an incremental confidence visualization system 102 that includes a result acquisition component 104 that may obtain a plurality of incremental query results 106 and a plurality of confidence interval values 108 associated with respective ones of the incremental query results 106. For example, the incremental query results 106 and confidence interval values 108 may be obtained based on transmission/receipt of query results from a back-end system processing one or more requests on one or more large datasets.

According to an example embodiment, the incremental confidence visualization system 102 may include executable instructions that may be stored on a computer-readable storage medium, as discussed below. According to an example embodiment, the computer-readable storage medium may include any number of tangible storage devices, and any number of storage media types, including distributed devices.

For example, an entity repository 110 may include one or more databases, and may be accessed via a database interface component 112. One skilled in the art of data processing will appreciate that there are many techniques for storing repository information discussed herein, such as various types of database configurations (e.g., relational databases, hierarchical databases, distributed databases) and non-database configurations.

According to an example embodiment, the incremental confidence visualization system 102 may include a memory 114 that may store the incremental query results 106 and confidence interval values 108. In this context, a "memory" may include a single memory device or multiple memory devices configured to store data and/or instructions. Further, the memory 114 may span multiple distributed storage devices.

According to an example embodiment, a user interface component 116 may manage communications between a user 118 and the incremental confidence visualization system 102. The user 118 may be associated with a receiving device 120 that may be associated with a display 122 and other input/output devices. For example, the display 122 may be configured to communicate with the receiving device 120, via internal device bus communications, or via at least one network connection.

According to example embodiments, the display 122 may be implemented as a flat screen display, a print form of display, a two-dimensional display, a three-dimensional display, a static display, a moving display, sensory displays such as tactile output, audio output, and any other form of output for communicating with a user (e.g., the user 118).

According to an example embodiment, the incremental confidence visualization system 102 may include a network communication component 124 that may manage network communication between the incremental confidence visualization system 102 and other entities that may communicate with the incremental confidence visualization system 102 via at least one network 126. For example, the at least one network 126 may include at least one of the Internet, at least one wireless network, or at least one wired network. For example, the at least one network 126 may include a cellular network, a radio network, or any type of network that may support transmission of data for the incremental confidence visualization system 102. For example, the network communication component 124 may manage network communications between the incremental confidence visualization system 102 and the receiving device 120. For example, the network communication component 124 may manage network communication between the user interface component 116 and the receiving device 120.

A visualization object determination component 128 may determine, via a device processor 130, a plurality of visualization shape objects 132 indicating uncertainty values 134, based on mapping values of respective ones of the incremental query results 106 and confidence interval values 108 to points in the associated ones of the visualization shape objects 132, the uncertainty values 134 visualized based on proportional shapes of the visualization shape objects 132.

In this context, a "visualization object" may include shapes, shadings, annotations, entities that include descriptions of shapes, shading, and/or annotations, or any type of entity that may be used to provide a display of a visual item for a user. In this context, "visual" may include items that may be sensed other than by sight of a user (e.g., tactile sensing, auditory sensing). For example, a visualization object may include a data structure that describes a two-dimensional rectangular or tapered bar, or a pie chart. For example, a visualization object may include an image file or other type of file suitable for display or play on a device. For example, a visualization object may include a drawing.

For example, a user application 136 may initiate operations that may obtain results for a user incrementally. For example, the user application 136 may request results from one or more search engines 138. For example, the one or more search engines 138 may be implemented as part of the incremental confidence visualization system 102, and/or may function as one or more separate entities that may be accessible over the network 126. For example, the search engines 138 may include search engines such as BING, YAHOO!, and/or GOOGLE.

In this context, a "processor" may include a single processor or multiple processors configured to process instructions associated with a processing system. A processor may thus include multiple processors processing instructions in parallel and/or in a distributed manner. Although the device processor 130 is depicted as external to the incremental confidence visualization system 102 in FIG. 1, one skilled in the art of data processing will appreciate that the device processor 130 may be implemented as a single component, and/or as distributed units which may be located internally or externally to the incremental confidence visualization system 102, and/or any of its elements.

A visualization comparison component 140 may determine at least one visualization comparison object 142 representing a comparison of a plurality of distributions 144 associated with the obtained incremental query results 106 and confidence interval values 108.

In this context, a "visualization comparison object" may include shapes, shadings, annotations, entities that include descriptions of shapes, shading, and/or annotations, or any type of entity that may be used to provide a display of a visual item for a user. In this context, "visual" may include items that may be sensed other than by sight of a user (e.g., tactile sensing, auditory sensing). For example, a visualization comparison object 142 may include a data structure that describes a two-dimensional (or 3-dimensional) rectangular or tapered bar, or a pie chart. For example, a visualization comparison object may include an image file or other type of file suitable for display or play on a device. For example, a visualization comparison object 142 may include a drawing.

A visualization object output component 146 may initiate display of the plurality of visualization shape objects 132 and the at least one visualization comparison object 142. According to example embodiments, the display may be implemented as a flat screen display, a print form of display, a two-dimensional display, a three-dimensional display, a static display, a moving display, sensory displays such as tactile output, audio output, and any other form of output for communicating with a user (e.g., the user 118).

For example, the incremental query results 106 may be related to a task of the user 118 based on a session of user interaction with the user application 136, and the incremental query results 106, confidence interval values 108, and/or visualization shape objects 132 may be stored in session-based storage on the receiving device 120.

According to an example embodiment, an animation component 148 may determine incremental groups of the plurality of incremental query results 106 and associated confidence interval values 108, based on a plurality of temporal intervals associated with incremental convergence of the plurality of incremental query results 106.

According to an example embodiment, the visualization object determination component 128 may determine incremental sets of the visualization shape objects indicating uncertainty values 134, based on mapping values of respective ones of the incremental groups to points in the associated ones of the incremental sets, the uncertainty values 134 visualized based on proportional shapes of the visualization shape objects 132.

According to an example embodiment, the visualization comparison component 140 may determine incremental instances of the at least one visualization comparison object 142 representing the comparison of the plurality of distributions 144 associated with the obtained incremental query results 106 and confidence interval values 108, based on the incremental sets.

According to an example embodiment, the visualization object output component 146 may initiate incremental display of the incremental sets of the plurality of incremental query results 106, based on the plurality of temporal intervals associated with the incremental convergence of the plurality of incremental query results 106.

According to an example embodiment, a shaded gradient component 150 may determine shaded gradient visualization fill 152 associated with the visualization shape objects 132, the shaded gradient visualization fill 152 indicating the uncertainty values 134, based on mapping values of respective ones of the incremental query results 106 and confidence interval values 108 to points in the associated ones of the visualization shape objects 132.

According to an example embodiment, the shaded gradient component 150 may determine shaded gradient visualization fill 152 associated with the visualization shape objects 132, the shaded gradient visualization fill 152 including a progressively darker gradient fill as points in respective regions converge to final values, as discussed further below.

According to an example embodiment, the visualization comparison component 140 may determine the at least one visualization comparison object 142 based on determining one or more probabilities 154 that a first distribution final value 156 is higher than a second distribution final value 158.

According to an example embodiment, the at least one visualization comparison object 142 may include one or more of a pie chart representing a comparison of a plurality of distributions 144 associated with the obtained incremental query results 106 and confidence interval values 108, or a bar chart representing a comparison of a plurality of distributions 144 associated with the obtained incremental query results 106 and confidence interval values 108.

According to an example embodiment, an annotation component 160 may determine a plurality of graphic bars 162 indicating locations of confidence interval bounds 164 associated with the obtained confidence interval values 108, based on mapping the graphic bars 162 to points in the respective visualization shape objects 132 associated with the respective obtained confidence interval values 108.

According to an example embodiment, a personalization component 166 may obtain personalization information 168 associated with preferences 170 of a user, the personalization information 168 including one or more of a color preference associated with a probability magnitude, a shape preference associated with visualization shape objects 132, or a gradient preference value associated with a gradient fill of visualization shape objects 132.

According to an example embodiment, the visualization shape objects 132 may include rectangular 172 visualization shape objects that include modulated levels of a first color fill on a second color.

According to an example embodiment, the visualization shape objects 132 may include rectangular 172 visualization shape objects that include modulated levels of colored fill and a plurality of graphic bars 162 indicating locations of confidence interval bounds 164 associated with the obtained confidence interval values 108, based on mapping the graphic bars 162 to points in the respective visualization shape objects 132 associated with the respective obtained confidence interval values 108.

According to an example embodiment, the visualization shape objects 132 may include tapered 174 visualization shape objects that include tapered widths proportional to respective probabilities associated with the obtained confidence interval values 108.

According to an example embodiment, the respective probabilities associated with the obtained confidence interval values may represent probabilities that respective points included in the visualization shape objects 132 include actual final values of query results.

According to an example embodiment, the plurality of distributions 144 associated with the obtained incremental query results 106 may be associated with respective cumulative density functions.

According to an example embodiment, the tapered visualization shape objects 132 may include one or more of tapered widths proportional to respective probabilities associated with the obtained confidence interval values 108, with a single color fill, tapered widths proportional to respective probabilities associated with the obtained confidence interval values, with progressively lighter color fill extending from respective midpoints of the tapered 174 visualization shape objects toward endpoints of the tapered 174 visualization shape objects, tapered widths proportional to respective probabilities associated with the obtained confidence interval values 108, with progressively darker color fill extending from respective midpoints of the tapered 174 visualization shape objects toward endpoints of the tapered 174 visualization shape objects, tapered widths proportional to respective probabilities associated with the obtained confidence interval values 108, with annotated graphic bars 162 indicating locations of confidence interval bounds 164 associated with the obtained confidence interval values 108, the annotated graphic bars 162 including widths associated with the tapered widths of the tapered 174 visualization shape objects, at the respective locations of the confidence interval bounds 164, or tapered widths proportional to respective probabilities associated with the obtained confidence interval values 108, with shaded gradient color fill.

Figure 2A:
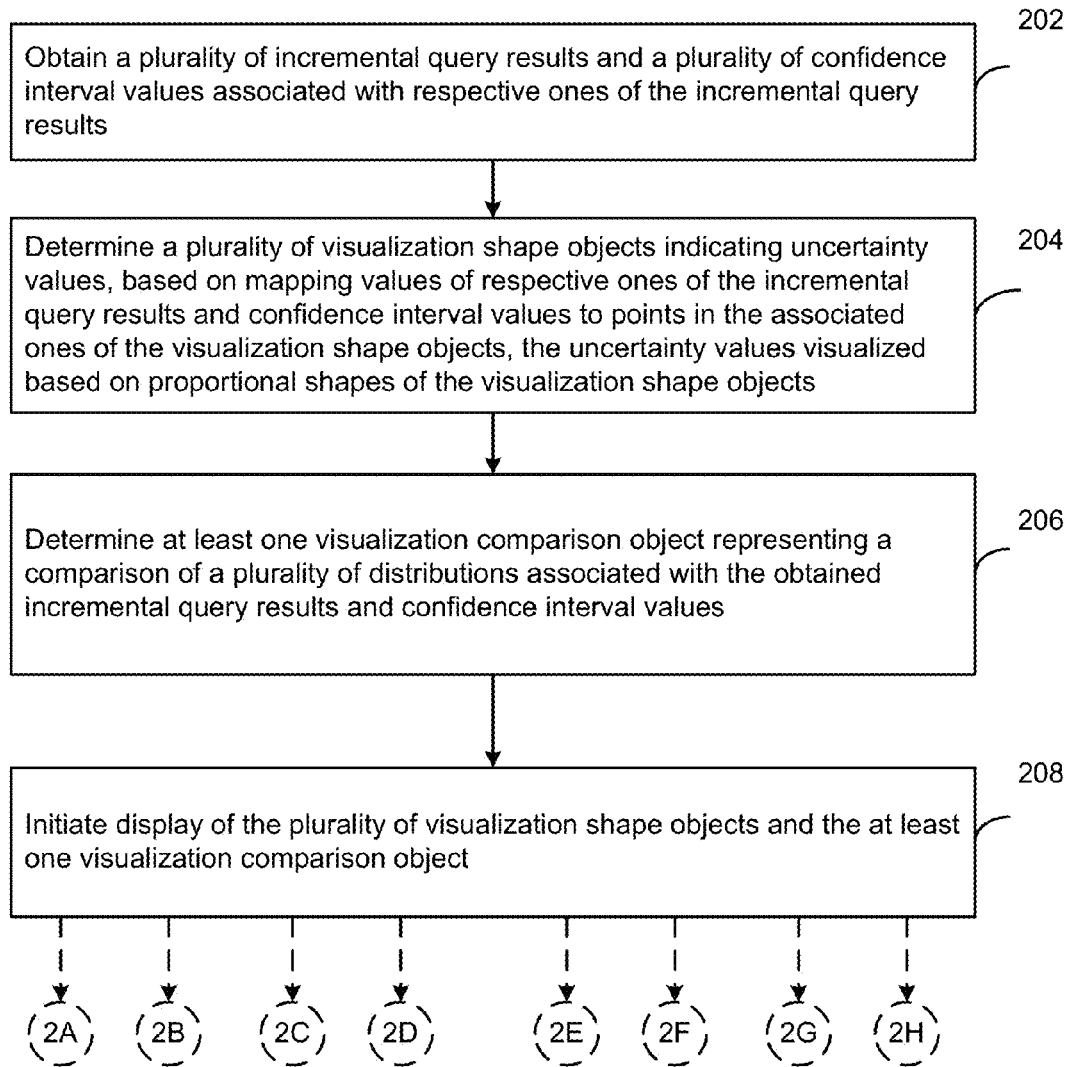
FIG. 2 is a flowchart illustrating example operations of the system of FIG. 1.

FIG. 2 is a flowchart illustrating example operations of the system of FIG. 1, according to example embodiments. In the example of FIG. 2a, a plurality of incremental query results and a plurality of confidence interval values associated with respective ones of the incremental query results may be obtained (202). For example, the result acquisition component 104 may obtain the incremental query results 106 and the confidence interval values 108 associated with respective ones of the incremental query results 106, as discussed above.

A plurality of visualization shape objects indicating uncertainty values may be determined, based on mapping values of respective ones of the incremental query results and confidence interval values to points in the associated ones of the visualization shape objects, the uncertainty values visualized based on proportional shapes of the visualization shape objects (204). For example, the visualization object determination component 128 may determine, via the device processor 130, a plurality of visualization shape objects 132 indicating uncertainty values 134, based on mapping values of respective ones of the incremental query results 106 and confidence interval values 108 to points in the associated ones of the visualization shape objects 132, the uncertainty values 134 visualized based on proportional shapes of the visualization shape objects 132, as discussed above.

At least one visualization comparison object representing a comparison of a plurality of distributions associated with the obtained incremental query results and confidence interval values may be determined (206). For example, the visualization comparison component 140 may determine at least one visualization comparison object 142 representing a comparison of a plurality of distributions 144 associated with the obtained incremental query results 106 and confidence interval values 108, as discussed above.

Display of the plurality of visualization shape objects and the at least one visualization comparison object may be initiated (208). For example, the visualization object output component 146 may initiate display of the plurality of visualization shape objects 132 and the at least one visualization comparison object 142, as discussed above.

According to an example embodiment, incremental groups of the plurality of incremental query results and associated confidence interval values may be determined, based on a plurality of temporal intervals associated with incremental convergence of the plurality of incremental query results (210). For example, the animation component 148 may determine incremental groups of the plurality of incremental query results 106 and associated confidence interval values 108, based on a plurality of temporal intervals associated with incremental convergence of the plurality of incremental query results 106, as discussed above.

According to an example embodiment, incremental sets of the visualization shape objects indicating uncertainty values may be determined, based on mapping values of respective ones of the incremental groups to points in the associated ones of the incremental sets, the uncertainty values visualized based on proportional shapes of the visualization shape objects (212). For example, the visualization object determination component 128 may determine incremental sets of the visualization shape objects indicating uncertainty values 134, based on mapping values of respective ones of the incremental groups to points in the associated ones of the incremental sets, the uncertainty values 134 visualized based on proportional shapes of the visualization shape objects 132, as discussed above.

According to an example embodiment, incremental instances of the at least one visualization comparison object representing the comparison of the plurality of distributions associated with the obtained incremental query results and confidence interval values may be determined, based on the incremental sets (214). For example, the visualization comparison component 140 may determine incremental instances of the at least one visualization comparison object 142 representing the comparison of the plurality of distributions 144 associated with the obtained incremental query results 106 and confidence interval values 108, based on the incremental sets, as discussed above.

According to an example embodiment, incremental display of the incremental sets of the plurality of incremental query results may be initiated, based on the plurality of temporal intervals associated with the incremental convergence of the plurality of incremental query results (216). For example, the visualization object output component 146 may initiate incremental display of the incremental sets of the plurality of incremental query results 106, based on the plurality of temporal intervals associated with the incremental convergence of the plurality of incremental query results 106, as discussed above.

According to an example embodiment, shaded gradient visualization fill associated with the visualization shape objects may be determined, the shaded gradient visualization fill indicating the uncertainty values, based on mapping values of respective ones of the incremental query results and confidence interval values to points in the associated ones of the visualization shape objects (218). For example, the shaded gradient component 150 may determine shaded gradient visualization fill 152 associated with the visualization shape objects 132, the shaded gradient visualization fill 152 indicating the uncertainty values 134, based on mapping values of respective ones of the incremental query results 106 and confidence interval values 108 to points in the associated ones of the visualization shape objects 132, as discussed above.

According to an example embodiment, the shaded gradient visualization fill may include a progressively darker gradient fill as points in respective regions converge to final values (220). For example, the shaded gradient component 150 may determine shaded gradient visualization fill 152 associated with the visualization shape objects 132, the shaded gradient visualization fill 152 including a progressively darker gradient fill as points in respective regions converge to final values, as discussed above.

According to an example embodiment, the at least one visualization comparison object may be determined based on determining one or more probabilities that a first distribution final value is higher than a second distribution final value (222). For example, the visualization comparison component 140 may determine the at least one visualization comparison object 142 based on determining one or more probabilities 154 that a first distribution final value 156 is higher than a second distribution final value 158, as discussed above.

According to an example embodiment, the at least one visualization comparison object may include one or more of a pie chart representing a comparison of a plurality of distributions associated with the obtained incremental query results and confidence interval values, or a bar chart representing a comparison of a plurality of distributions associated with the obtained incremental query results and confidence interval values (224).

According to an example embodiment, a plurality of graphic bars indicating locations of confidence interval bounds associated with the obtained confidence interval values may be determined, based on mapping the graphic bars to points in the respective visualization shape objects associated with the respective obtained confidence interval values (226). For example, the annotation component 160 may determine a plurality of graphic bars 162 indicating locations of confidence interval bounds 164 associated with the obtained confidence interval values 108, based on mapping the graphic bars 162 to points in the respective visualization shape objects 132 associated with the respective obtained confidence interval values 108, as discussed above.

According to an example embodiment, the visualization shape objects may include rectangular visualization shape objects that include modulated levels of colored fill and a plurality of graphic bars indicating locations of confidence interval bounds associated with the obtained confidence interval values, based on mapping the graphic bars to points in the respective visualization shape objects associated with the respective obtained confidence interval values (228).

According to an example embodiment, the visualization shape objects may include one or more of rectangular visualization shape objects that include modulated levels of a first color fill on a second color, or tapered visualization shape objects that include tapered widths proportional to respective probabilities associated with the obtained confidence interval values (230).

According to an example embodiment, the respective probabilities associated with the obtained confidence interval values may represent probabilities that respective points included in the visualization shape objects include actual final values of query results (232).

According to an example embodiment, the plurality of distributions associated with the obtained incremental query results may be associated with respective cumulative density functions (234).

According to an example embodiment, the tapered visualization shape objects may include one or more of tapered widths proportional to respective probabilities associated with the obtained confidence interval values, with a single color fill, tapered widths proportional to respective probabilities associated with the obtained confidence interval values, with progressively lighter color fill extending from respective midpoints of the tapered visualization shape objects toward endpoints of the tapered visualization shape objects, tapered widths proportional to respective probabilities associated with the obtained confidence interval values, with progressively darker color fill extending from respective midpoints of the tapered visualization shape objects toward endpoints of the tapered visualization shape objects, tapered widths proportional to respective probabilities associated with the obtained confidence interval values, with annotated graphic bars indicating locations of confidence interval bounds associated with the obtained confidence interval values, the annotated graphic bars including widths associated with the tapered widths of the tapered visualization shape objects, at the respective locations of the confidence interval bounds, or tapered widths proportional to respective probabilities associated with the obtained confidence interval values, with shaded gradient color fill (236).

Figure 3:
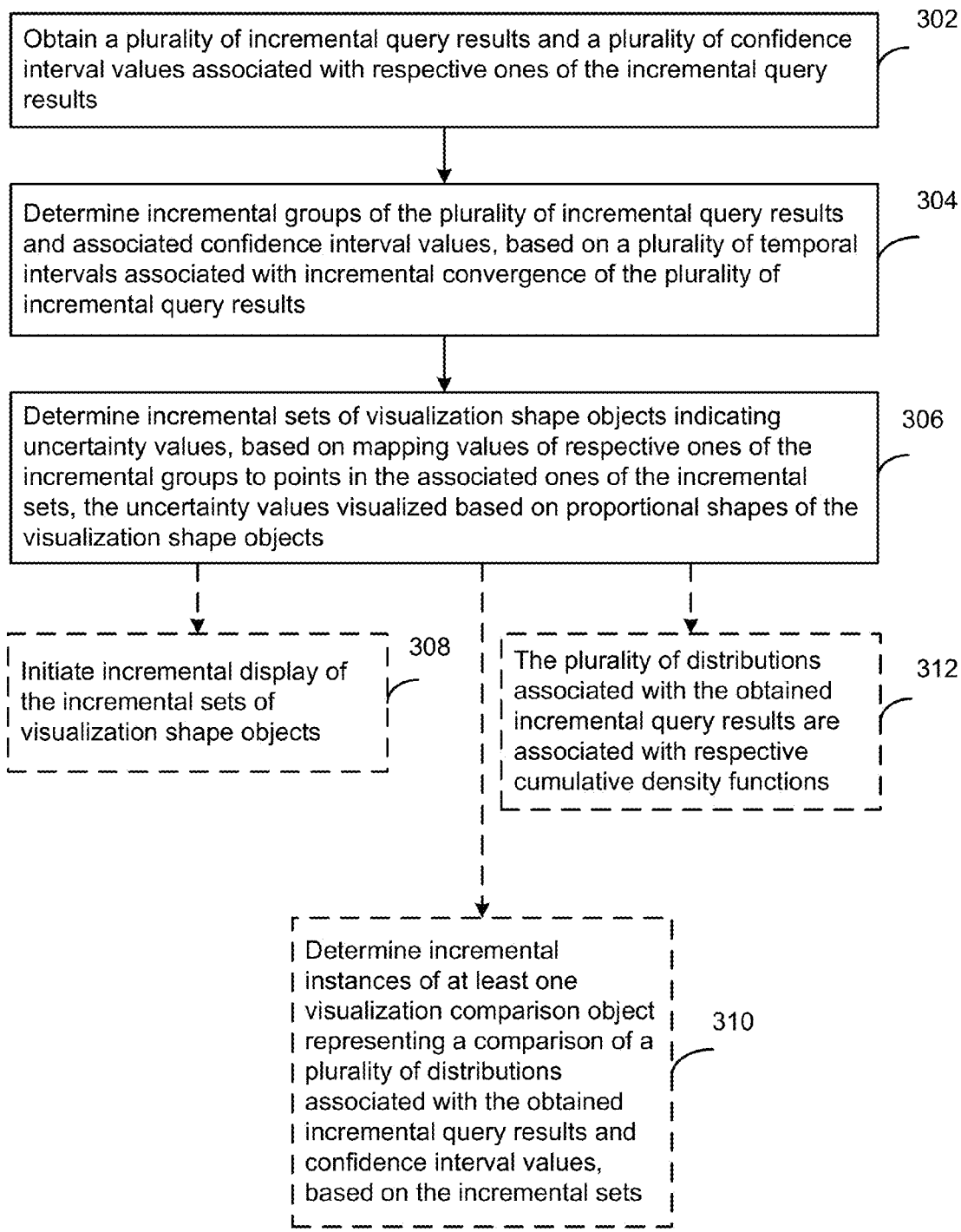
FIG. 3 is a flowchart illustrating example operations of the system of FIG. 1.

FIG. 3 is a flowchart 300 illustrating example operations of the system of FIG. 1, according to example embodiments. In the example of FIG. 3, a plurality of incremental query results and a plurality of confidence interval values associated with respective ones of the incremental query results may be obtained (302). For example, the result acquisition component 104 may obtain the incremental query results 106 and the confidence interval values 108 associated with respective ones of the incremental query results 106, as discussed above.

For example, at least a portion of the operations of FIG. 3 may be performed with regard to a user device such as the receiving device 120. For example, the user device may include one or more mobile devices, one or more desktop devices, or one or more server devices.

Incremental groups of the plurality of incremental query results and associated confidence interval values may be determined, based on a plurality of temporal intervals associated with incremental convergence of the plurality of incremental query results (304). For example, the animation component 148 may determine incremental groups of the plurality of incremental query results 106 and associated confidence interval values 108, based on a plurality of temporal intervals associated with incremental convergence of the plurality of incremental query results 106, as discussed above.

Incremental sets of visualization shape objects indicating uncertainty values may be determined, based on mapping values of respective ones of the incremental groups to points in the associated ones of the incremental sets, the uncertainty values visualized based on proportional shapes of the visualization shape objects (306). For example, the visualization object determination component 128 may determine incremental sets of the visualization shape objects indicating uncertainty values 134, based on mapping values of respective ones of the incremental groups to points in the associated ones of the incremental sets, the uncertainty values 134 visualized based on proportional shapes of the visualization shape objects 132, as discussed above.

According to an example embodiment, incremental display of the incremental sets of visualization shape objects may be initiated (308). For example, the visualization object output component 140 may initiate display of the incremental sets of visualization shape objects 132.

According to an example embodiment, incremental instances of at least one visualization comparison object representing a comparison of a plurality of distributions associated with the obtained incremental query results and confidence interval values may be determined, based on the incremental sets (310). For example, the visualization comparison component 140 may determine incremental instances of the at least one visualization comparison object 142 representing the comparison of the plurality of distributions 144 associated with the obtained incremental query results 106 and confidence interval values 108, based on the incremental sets, as discussed above.

According to an example embodiment, the plurality of distributions associated with the obtained incremental query results may be associated with respective cumulative density functions (312).

Figure 4A:
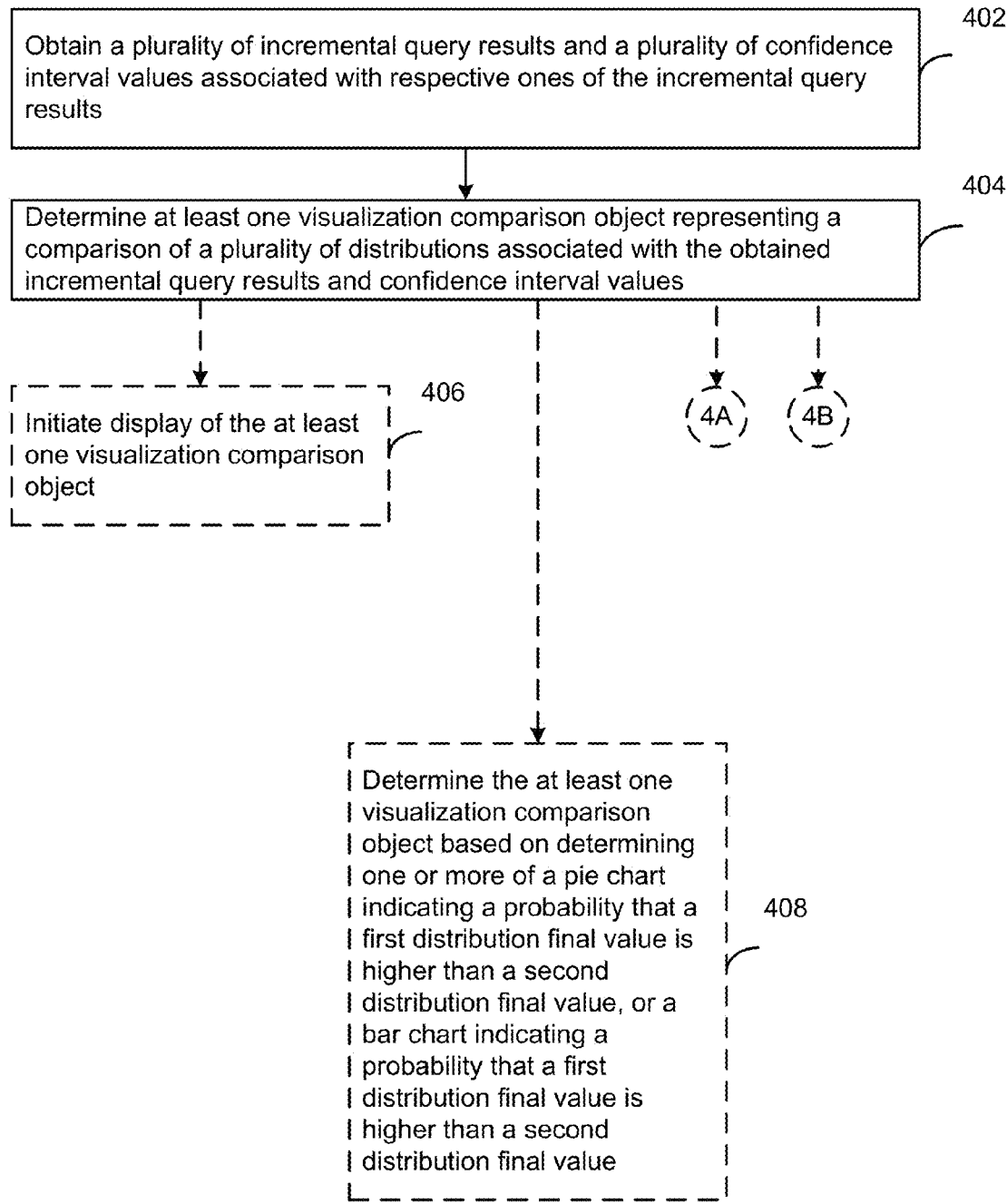
FIG. 4 is a flowchart illustrating example operations of the system of FIG. 1.

FIG. 4 is a flowchart 400 illustrating example operations of the system of FIG. 1, according to example embodiments. In the example of FIG. 4, a plurality of incremental query results and a plurality of confidence interval values associated with respective ones of the incremental query results may be obtained (402). For example, the result acquisition component 104 may obtain the incremental query results 106 and the confidence interval values 108 associated with respective ones of the incremental query results 106, as discussed above.

At least one visualization comparison object representing a comparison of a plurality of distributions associated with the obtained incremental query results and confidence interval values may be determined (404). For example, the visualization comparison component 140 may determine at least one visualization comparison object 142 representing a comparison of a plurality of distributions 144 associated with the obtained incremental query results 106 and confidence interval values 108, as discussed above.

According to an example embodiment, display of the at least one visualization comparison object may be initiated (406). For example, the visualization object output component 146 may initiate display of the at least one visualization comparison object 142.

According to an example embodiment, the at least one visualization comparison object may be determined based on determining one or more of a pie chart indicating a probability that a first distribution final value is higher than a second distribution final value, or a bar chart indicating a probability that a first distribution final value is higher than a second distribution final value (408). For example, the visualization comparison component 140 may determine the at least one visualization comparison object 142 based on determining one or more of a pie chart indicating a probability that a first distribution final value 156 is higher than a second distribution final value 158, or a bar chart indicating a probability that a first distribution final value 156 is higher than a second distribution final value 158, as discussed above.

According to an example embodiment, the at least one visualization comparison object may be determined based on determining one or more probabilities that a first distribution final value is higher than a second distribution final value (410). For example, the visualization comparison component 146 may determine the at least one visualization comparison object 148 based on determining one or more probabilities 152 that a first distribution final value 154 is higher than a second distribution final value 156, as discussed above.

According to an example embodiment, incremental groups of the plurality of incremental query results and associated confidence interval values may be determined, based on a plurality of temporal intervals associated with incremental convergence of the plurality of incremental query results (412). For example, the animation component 148 may determine incremental groups of the plurality of incremental query results 106 and associated confidence interval values 108, based on a plurality of temporal intervals associated with incremental convergence of the plurality of incremental query results 106, as discussed above.

According to an example embodiment, incremental instances of the at least one visualization comparison object representing the comparison of the plurality of distributions associated with the obtained incremental query results and confidence interval values may be determined, based on the incremental sets (414). For example, the visualization comparison component 140 may determine incremental instances of the at least one visualization comparison object 142 representing the comparison of the plurality of distributions 144 associated with the obtained incremental query results 106 and confidence interval values 108, based on the incremental sets, as discussed above.

According to an example embodiment, incremental display of the incremental instances of the at least one visualization comparison object may be initiated (416). For example, the visualization object output component 146 may initiate incremental display of the incremental instances of the at least one visualization comparison object 142, as discussed above.

In the context of large datasets, data queries may be submitted for overnight processing, as high-performance device clusters may process hundreds of terabytes for large-scale analysis jobs. Such slow throughput may imply that analysts may be advised to carefully consider their jobs, tweaking parameters for each run. An analyst may only be able to submit a few queries to a large dataset in the course of a study. However, using exploratory visualization, analysts may expect to try a long series of visualizations, exploring the relationships between dimensions and freely pivoting between the data.

The queries that users issue in exploratory visualization may differ substantially from queries associated with non-interactive batch systems. In exploratory systems, users may try riskier queries, and may modify their subsequent queries based on previous queries.

While tools like column-oriented databases and massively parallel data engines such as DREMEL and APACHE's HADOOP may aid in processing data more rapidly, many users may discover scenarios with more data than compute time. For example, some computing jobs may be inadequately matched for the architectures. For example, a query that involves processing or examining a stream of images may be slow as it may involve significant processing at each instance. Even with more structured data, keeping large clusters may be expensive in terms of both money and energy.

Instead of attempting to look at every line of data, an alternative may include online query processing. As discussed in J. Hellerstein, et al., "Interactive Data Analysis: the CONTROL project," *IEEE Computer*, 32(8), August, 1999, pp. 51-59, incremental queries may return partial results obtained by processing progressively larger random samples from the underlying data. This approach may be very helpful for aggregate queries, where the analyst e.g., may wish to determine an average or sum of specific values across subgroups in a dataset. While a precise aggregate value may not be computed without processing all the data, the desired value may often be approximated with high accuracy when a small fraction of the data has been processed. Further, the error on that approximation may be bounded. For example, the approximation error may be a function of the variance of the underlying data set, and, for random samples, may shrink with the square root of the number of values processed so far. As a result, example techniques discussed herein may present probability distributions to users, rather than fixed values. Users may understand whether the result in their current sample is likely to be definitive, or whether it may be desirable to wait for a longer time.

Example techniques discussed herein may provide exploratory visualization tools that may display distributions.

As an example, aggregate queries may be visualized via bar charts. For example, various aggregates may be computed, grouped by a single dimension, which may be used as the X axis, while the values of the aggregates may become Y values. For example, a bar chart may indicate the average time that flights are delayed, grouped by day of the week. For example, airline flight delay data may be obtained via a United States governmental "Airline On-Time Performance" dataset, available publicly via the Internet. Using approximate queries, an example system may instead generate an approximate aggregate, the confidence interval in which a user may expect the value to fall, once all the computation is complete. As an example, this confidence interval may be represented using error bars, indicating the range that covers 95% of expected values. For example, error bars have been used in J. Hellerstein, et al., "Interactive Data Analysis: the CONTROL project," supra. However, users may have difficulty interpreting confidence intervals.

According to example techniques discussed herein, approximate results may be returned rapidly and displayed in an easily interpretable way, so that users may generate queries and rapidly iterate on them. Thus, users may more easily make discoveries, modifying past queries to explore new facts, drilling deep into data, and viewing it from multiple perspectives. Queries that users issue in exploratory visualization may be quite different from queries used in non-interactive batch systems. For example, users of exploratory systems may submit queries associated with greater risks, and may modify their subsequent queries with the previous queries (and partial results) in mind.

Example techniques discussed herein may provide for user interaction with visualizations based on confidence intervals. Further, example techniques discussed herein may provide visualizations for users to compare the probability that one range will be larger than another.

Hellerstein, et al., "Interactive Data Analysis: the CONTROL project," supra discusses approximate queries, which may provide uncertain results. For example, instead of returning a definite aggregate value, the approximate query may instead return a probability distribution over possible aggregate values. Also discussed are preliminary error-bar visualizations as well as uncertain scatter plots.

An example system supporting a single-pass approximate value for implement interactive approximate queries is discussed in D. Slezak et al., "Towards approximate SQL: Infobright's approach, " *In Proceedings of the 7th international conference on Rough sets and current trends in computing* (RSCTC'10), Springer-Verlag, Berlin, Heidelberg, pp. 630-639. However, it may not support estimates that converge over time.

For example, research continues on techniques for supporting incremental queries work, e.g., in scenarios involving table joins. Further, sampling randomly may often involving maintaining data in random order, which conflicts with conventional indices, or full data-scale reads, as discussed in C. Jermaine, et al., "The Sort-Merge-Shrink Join," *ACM Transactions on Database Systems* 31(4), (December 2006), pp. 1382-1416.

Fisher et al., "Trust Me, I'm Partially Right: Incremental Visualization Lets Analysts Explore Large Datasets Faster," In: *CHI* 2012, May 5-12, Austin, Tex., discusses an example system that supports experimentation with realistic front-end data. An example goal of the system discussed therein is to produce a realistic experience that allows users to understand data, and to promote an understanding of behavior over datasets. For example, it may be desired to incrementally update samples from a real database, without a need for a back-end that fully implements incremental callbacks. This behavior may be simulated, for example, by connecting the example front-end to a smaller, and tractable, back-end. In this small back-end, queries may be run rapidly, at interactive speeds, allowing experimentation with designs prior to building a system against a full-scale back-end.

The example Fisher et al. (supra) system may be referred to as sampleAction, which includes a Tableau-like interface that allows users to formulate queries visually. The example front-end allows users to visually specify a series of independent dimensions, and a measure. The example system responds with a partial result, displaying a bar chart with confidence bounds; as the analyst waits, the system may increase its sample size every second, narrowing the confidence intervals and producing more precise results.

In experimental testing on the sampleAction system (and using the airline delay dataset discussed above), tests indicated that an analyst could conclude that, with 90% probability, a true average delay on Friday was somewhere between 6 and 12 minutes, and on Saturday was between 2 and 8 minutes. These conclusions could be drawn by looking at 56000 rows (0.32% of the full database). An analyst may pause or stop the incremental process at any time, and may also start additional queries while the previous ones are still running All queries will continue to add samples and slowly converge.

The back end of sampleAction also returns confidence bounds and row counts. For example, a Structured Query Language (SQL) engine may store the data in a single table, in a pre-randomized order. Thus, a random sample may be simulated simply by querying contiguous rows. To simulate increasingly-sized samples, a user may simply query against larger counts of rows. Each of these queries may be sized to be resolved quickly. Thus, querying across several hundred thousand rows may be done in interactive time. The aggregate may thus be determined, as well as the variance and row count observed so far.

As experimental testing, data experts employed by a large, data-intensive corporation provided sample data, each expert providing approximately a million rows of sample data, from a dataset familiar to the experts, but which had not been visualized for the experts. For example, a first expert's team manages server operations, and generates static, visual reports of his system's performance once a day. A second expert tracks marketing for online games, as his team writes custom code based on a massive database to answer specific customer requests. A third expert is a researcher working on social media, analyzing large corpuses of messages, searching for trends in emotion.

In the experimentation, the first expert was able to rapidly identify that some of his team's logging work was wasted, as one error code was indicated to be a reflection of a different one. The second expert analyzed questions such as the average age of players, by country and by game, discovering that some combinations of games and countries were surprisingly exceptional. The second expert drilled in through various dimensions, filtering aggressively to compare specific scenarios.

The third expert rapidly discovered that one of the keywords he was searching for was far more frequent than others, and that when he removed that keyword from the set, other distributions on his data changed significantly. He realized he would have to readjust his experiment to account for this scenario.

None of the three experts were accustomed to performing interactive queries against this data. Each explored blind alleys, made mistakes, and ultimately issued a large number of queries (e.g., at least a dozen queries), thus exploring data that, in other circumstances, might have taken weeks to explore, or, may not have been explored at all.

As part of the experimentation, it was observed that the experts used bar chart visualizations in conjunction with a series of tasks that they were attempting to fulfill. For example, they may wish to compare a pair (or series) of bars to determine which bar is highest. For example, they may wish to determine exceptional outliers, to determine whether any values appear exceptional in comparison with others. As another example, users may wish to analyze paired charts. For example, users may wish to obtain histograms in order to compare visualizations of datasets, such as by using different filter settings.

As part of the experimentation, it was observed that confidence intervals (especially in the early stages of computation before they have converged) may be orders of magnitude larger than the true values. Thus, users may view a screen of large intervals with comparatively very small values. Thus, zooming in close enough to view the bars may hide the confidence interval.

Figure 5:
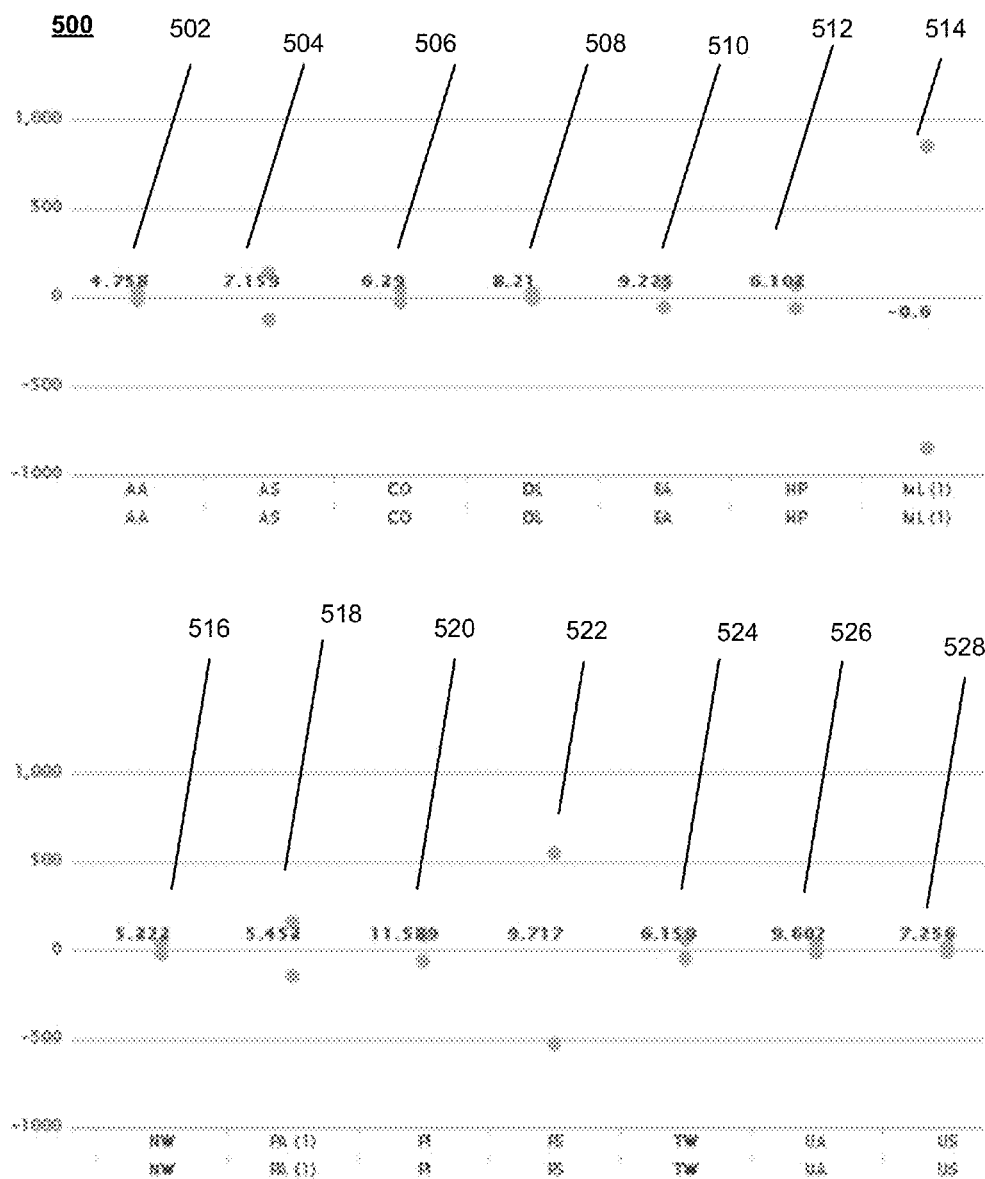
FIG. 5 illustrates an example visualization of average values with confidence intervals.

FIG. 5 illustrates an example visualization 500 of average values with confidence intervals. As shown in FIG. 5, points depicting confidence intervals are displayed with average delay values 502, 504, 506, 508, 510, 512, 514, 516, 518, 520, 522, 524, 526, 528 across a dataset for respective airlines depicted as 'AA', 'AS', 'CO', 'DL', 'EA', 'HP', 'ML(1)', 'NW', 'PA(1)', 'PI', 'PS', 'TW', 'UA', and 'US'. As shown in FIG. 5, confidence intervals for some of the airlines are wide (e.g., at 514 for 'ML(1)' and at 522 for 'PS'), while others include narrow confidence intervals at an early stage in processing. For example, the airline ML has a confidence interval ranging from nearly −700 to +700. The other airlines have tighter constraints, and thus display as much smaller ranges.

After some of the values had converged further in experimentation, challenges of scale continued in visualizations. For example, if the scale was set so that the extents of error bars were fully visible, then the differences between true values could be almost invisible (e.g., similar to comparing 5+−3, 6 +−2, and 4 +−500). For example, if a user turned off an out-of-scale-error bar display in order to track current estimates, he/she may then lose track of the size of the bar.

Further, the experts experienced difficulty in determining whether a bar was converging slowly because the underlying distribution had a large variance (and thus might not converge), or because comparatively few values had been seen so far (and therefore the user might consider waiting longer). The experts occasionally employed a tooltip provided to understand how many samples drove the bar.

Thus, example techniques discussed herein may assist users in better understanding the confidence intervals associated with their data. For example, a user may wish that, as the size of a confidence interval shrinks toward zero, the visualization will resemble a bar chart. As another example, a user may wish that, if a bar does not fit on screen, the user may understand whether the region they are viewing is a 'probable' or 'improbable' region, and whether it is above or below the current estimator.

As another example, a user may wish that, if the user is viewing two bars side-by-side, they may be able to compare which of them is likely to have a smaller or larger value. As another example, a user may wish that, as the confidence interval converges, the visualization may change smoothly. As another example, a user may wish that values that have a narrow confidence bound may be at least as easy to read as values that have a broader confidence bound.

Bar charts with error bars may be difficult to compare to each other, except in scenarios wherein when the confidence intervals do not overlap. Further, a zoomed-in error bar may resemble a vertical line without features or texture to indicate location. Further, a bar with an uncertainty range may be bigger and more visible than a converged value.

Example techniques discussed herein may provide various visualizations that may include gradient coloring, altering the width of a gradient bar, and/or annotating the gradient of these with tick marks, or graphic bars.

A. Streit et al., "A Spreadsheet Approach to Facilitate Visualization of Uncertainty in Information," IEEE Transactions on Visualization and Computer Graphics, 14(1) (January 2008), pp. 61-72, suggest a gradient visualization, such that thicker areas may suggest a greater aggregate confidence, while lighter areas may suggest less confidence.

Example techniques discussed herein may utilize gradients such that the mathematics are mapped to the values. For example, it may be desirable for saturation to be proportionate to the probability that a given point will be the final value. As suggested above, a 95% confidence interval indicates a belief that there is a 5% chance that the final value will be either larger than the upper limit, or smaller than the lower. According to an example embodiment, the 95% confidence interval points may be set to be displayed as a very pale color. As any point might theoretically be possible (but very improbable), the bars may continue indefinitely in each direction, ever paler. As the '0%' interval is the point wherein there is a 50% chance that the final value will be higher, and a 50% chance that the final value will be lower, that midpoint may be set to be displayed as pure black. Colors for other points may be determined based on computing the confidence level associated with them, and computing a relevant value of gray in between. One skilled in the art of data processing will understand that many other colorings and/or shadings may be used, without departing from the spirit of the discussions herein.

For some probability distributions, these regions may not be uniform. According to an example embodiment, a variation of the Bernstein inequality may be utilized to estimate the expected range of values (see, e.g., A. Maurer et al., "Empirical Bernstein bounds and sample-variance penalization," *In Proceedings of the Twenty-Second Annual Conference on Learning Theory*, 7, (2009), pp. 115-124). This inequality may define a region of near-uniform probability at the center, which has a broad region of near-equal saturation. As the confidence intervals converge, this visualization may converge toward a narrow black line, and thus may reduce to a bar chart.

Example techniques discussed herein may utilize balanced gradients. However, as discussed below, this gradient visualization may generate a large, black-colored region. This range may visually dominate the image, such that users' eyes may be drawn to the large black region, rather than the smaller focused region. According to an example embodiment, the gradient may be lightened at the center when it is wide, and the center point may be gradually darkened as the confidence intervals converge. Thus, an example visual effect may suggest an effect similar to smoke coalescing, as bar becomes steadily darker as the edges converge. One skilled in the art of data processing will understand that many other colorings and/or shadings may be used, without departing from the spirit of the discussions herein.

Example techniques discussed herein may utilize tapered edges for visualizations. For example, confidence may be mapped to bar width, and may be mapped in conjunction with the gradient visualization. As discussed above, the base thickness may be defined at the most probable point, such that, at the 95% confidence level, a line may be drawn that is 5% as thick as the thickness at the center. This visualization may be used even when bar color is being used for a different purpose, and, for some users, may be more evocative of a notion of likelihood.

Example techniques discussed herein may utilize annotation of the visualization. For example, 'ribs' (e.g., graphic bars 160) may be added to both error bars, and to gradients, by adding ticks showing confidence intervals, in addition to placing one tick at the center, and additional end-caps at the ends of the confidence interval. Both the orientation of these ribs and their sizes may help users maintain an orientation within the bar.

In accordance with example embodiments discussed herein, alternative designs may help users compare distributions to each other. For example, alternatives to bar charts with error bars may be determined so as to continue to be effective even when distributions are on substantially different scales.

For example, it may be desirable for a visualization to reduce to a bar chart (e.g., as the size of a confidence interval shrinks toward zero, the visualization may show an unambiguous (and familiar) single point).

For example, it may be desirable for a visualization to allow zooming (e.g., if a bar does not fit on screen, the user may understand whether the region he/she is viewing is a probable or improbable region).

For example, it may be desirable for a visualization to allow comparison (e.g., if a user is looking at two bars side-by-side, he/she may be able to compare which of them is likely to have a smaller or larger value).

For example, it may be desirable for a visualization to desirable map to animation (e.g., as the confidence interval converges, the visualization may change smoothly). The bar chart with error bars scores may not perform desirable on these criteria. Error bars may be difficult to compare to each other, except in a case when the confidence intervals do not overlap. A zoomed-in error bar may resemble a vertical line without features, and may not provide desirable scaling.

In accordance with example embodiments discussed herein, the probability distribution may be represented as a cumulative density function. Many types of visualizations are meant for distributions across a real sample, and thus show individual values, such as outliers. Unlike conventional box plots, which are based on individual data points, these distributions are instead the result of a prediction function.

Computing a cumulative density function may be a generalization of error bars. Error bars, such as a 90% range, may indicate that there is a 90% chance that the final value will fall within this range; there is a 10% chance that the final value will fall outside of the range. Extending that value, the probability that the true value will be outside of this point may be determined. Example techniques discussed herein may consider the outside probability—the 10%, rather than the 90%—in order to ensure that at the center, the function is at its highest value.

According to example embodiments discussed herein, "density strips" and modified "box-percentile" plots may be used for illustrating these distributions. A density strip may represent relative probability as a gradient, such that more-likely locations may be rendered darkly, while less-likely locations may be lighter. Rather than coding color, shape may be coded, as wider points may be more probable, while narrower points may represent less probable outcomes.

Density gradients may be used as a representation for uncertainty. For example, Streit, A., et al., "A Spreadsheet Approach to Facilitate Visualization of Uncertainty in Information," *IEEE Transactions on Visualization and Computer Graphics*, Vol. 14 Issue 1, January 2008, pp. 61-72 suggest a gradient visualization, in which darker areas suggest a greater confidence, while lighter areas suggest less confidence. "Density strips," as discussed in "Christopher H. Jackson, "Displaying Uncertainty With Shading," *The American Statistician*, Vol. 62, Issue 4 (2008), pp. 340-347, are visualizations that assign gray levels to the density of the probability function. According to an example embodiment, the highest probability value may be set to be black, and the bars may continue indefinitely outward.

Unfortunately, the dark areas may overwhelm the visual area, as the thick dark lines may be more visible than the nearly-converged values.

Thus, as another example, it may be desirable for a visualization to have appropriate visual salience (e.g., values that have a narrow confidence bound may be at least as easy to read as values that have a broader confidence bound).

While Jackson, supra, suggests scaling to the largest density across all the strips, that would not apply to animated visualization discussed herein, as users may expect that the visualizations will grow darker over time as the dataset converges. Instead, a threshold may be selected which may be labeled as "black." For example, the black level may be used as a function of the estimate values of the bars.

Figure 6A:
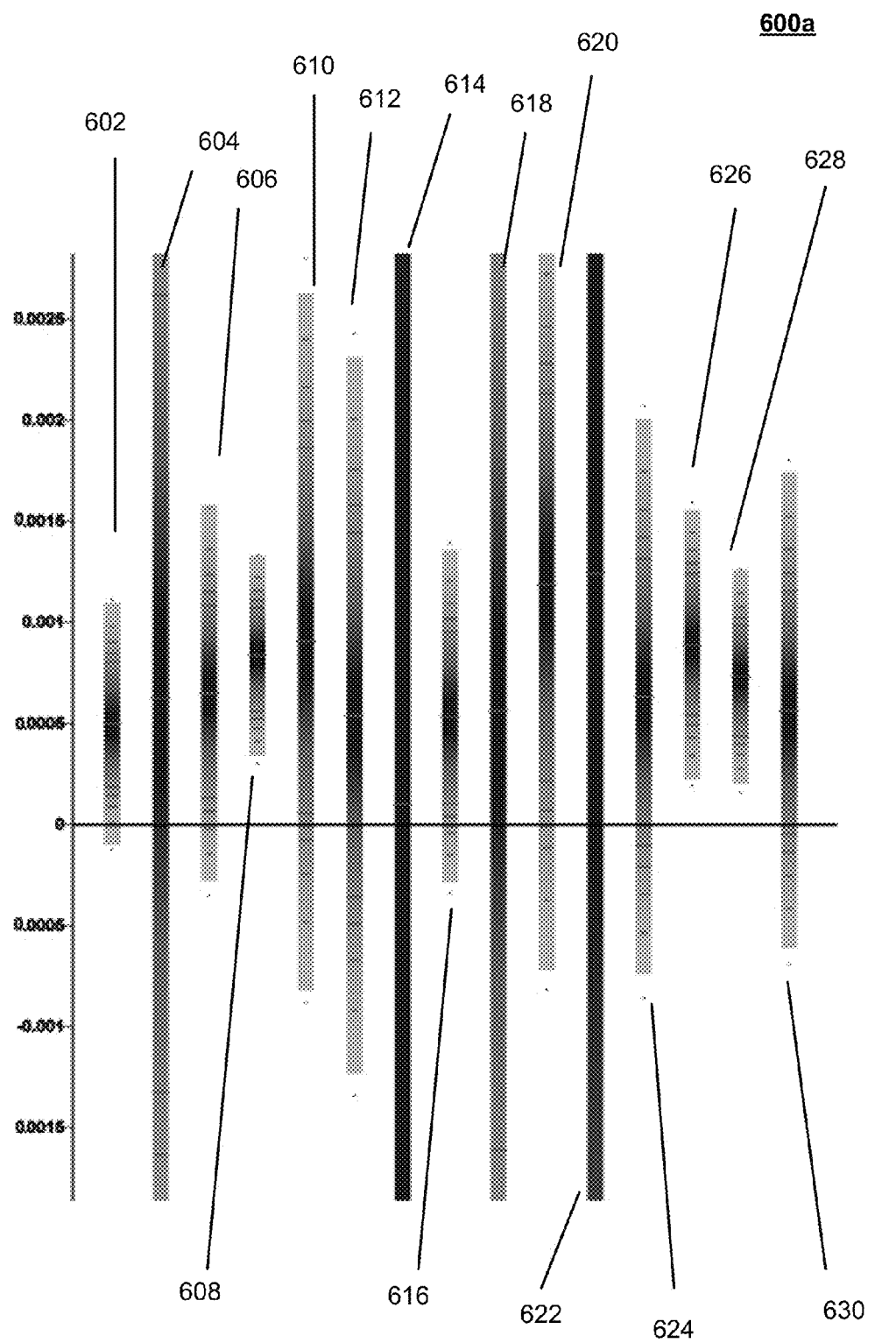
FIG. 6 depicts example variations of visualizations generated in accordance with the example system of FIG. 1.

FIG. 6 depicts example variations of visualizations generated in accordance with the example system of FIG. 1. One skilled in the art of data processing will understand that many other variations and combinations may also be generated in accordance with example embodiments, without departing from the spirit of the discussions herein. As shown in FIG. 6a, density strips may be generated with black at the midpoint, and linear decrease from there. For example, gradient confidence intervals may be depicted on a rectangular background, as shown in example visualizations 602, 604, 606, 608, 610, 612, 614, 616, 618, 620, 622, 624, 626, 628, and 630. As shown in FIG. 6a, tick marks (e.g., graphic bars 160) may annotate the visualizations. According to example embodiments, the tick marks (e.g., graphic bars 160) may be displayed in various colors (e.g., red for 0% confidence level, green for other confidence levels, or varying colors for different levels), and may be personalized in accordance with user preferences for depicting the confidence intervals. According to example embodiments, the tick marks (e.g., graphic bars 160) may be displayed in widths that are proportional to their respective confidence levels. As shown in FIG. 6a, tick marks (e.g., graphic bars 160) may annotate the visualizations, for example, to depict confidence interval bounds.

Figure 6B:
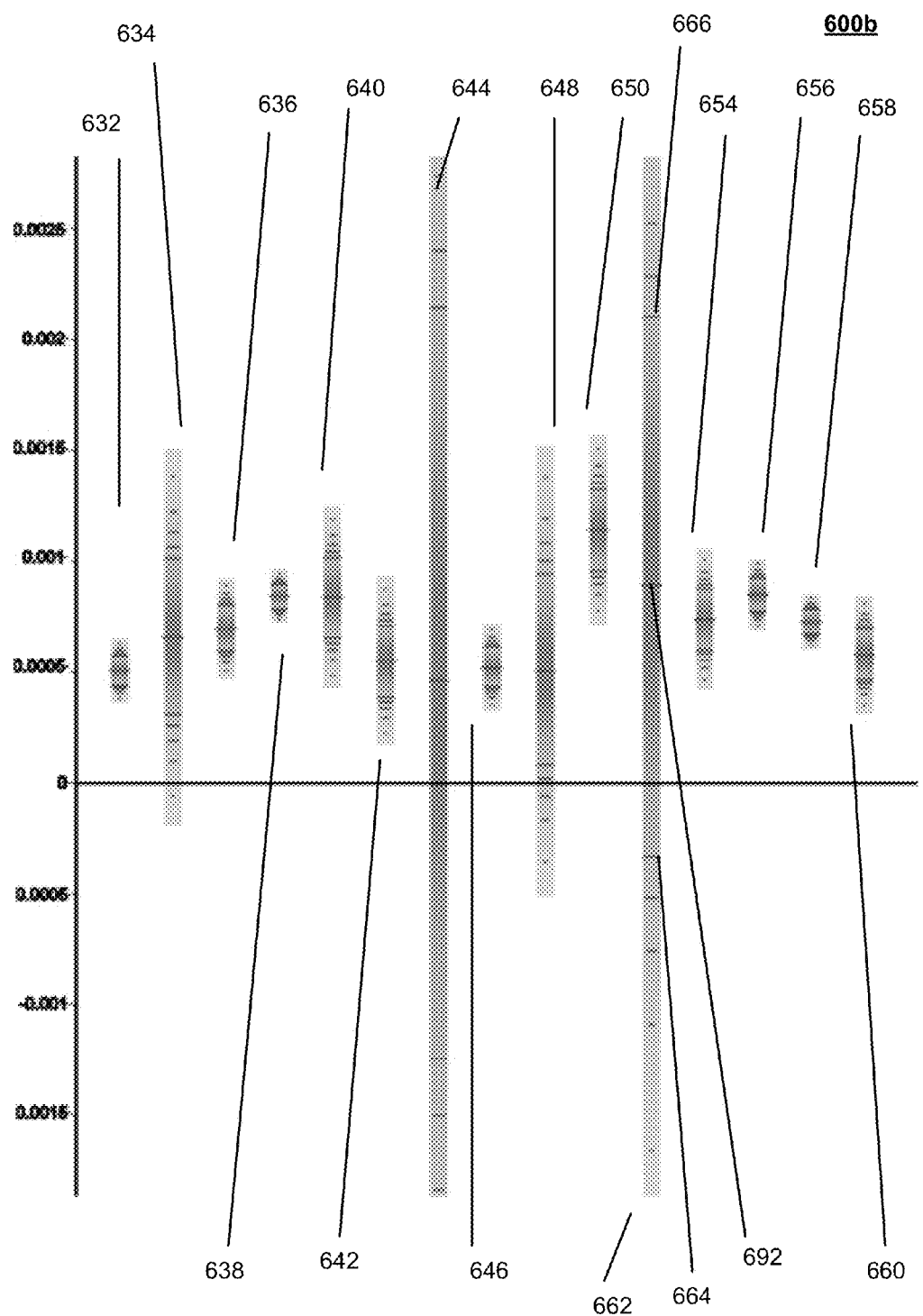

As shown in FIG. 6b, density strips may be modulated so that only the high density levels are black. For example, subtle green tick marks may represent percentiles at 10% intervals. For example, the particular estimator of uncertainty used may have a large central portion which is equally probable, such that the green bands may be clustered at the edges. As shown in FIG. 6b, gradient confidence intervals may be depicted as rectangles with modulated levels of black, as shown in example visualizations 632, 634, 636, 638, 640, 642, 644, 646, 648, 650, 652, 654, 656, 658, and 660. As shown in FIG. 6b, tick marks (e.g., graphic bars 160) such as tick marks 662, 664, and 666 may annotate the visualizations. As shown in FIG. 6b, the tick marks may represent uncertainty levels. According to example embodiments, the tick marks (e.g., graphic bars 160) may be displayed in various colors (e.g., green, red, different colors for different confidence levels), and may be personalized in accordance with user preferences for depicting the confidence intervals. According to example embodiments, the tick marks may be displayed in widths that are proportional to their respective confidence levels.

According to example embodiments, confidence may be mapped to bar width, for example, in conjunction with the gradient visualization. The base thickness may be defined at the most probable point; at the 95% confidence level, and a line 5% as thick as the thickness may be drawn at the center. The visualization shown below in FIG. 7 may be used even when bar color is being used for a different purpose, and, to some users, may be more evocative of the notion of likelihood. This visualization is a variant of the "box-percentile" plot, as discussed by Esty, W., et al., "The Box-Percentile Plot," *Journal of Statistical Software*, Vol. 8, Issue 17, (2003).

Figure 7A:
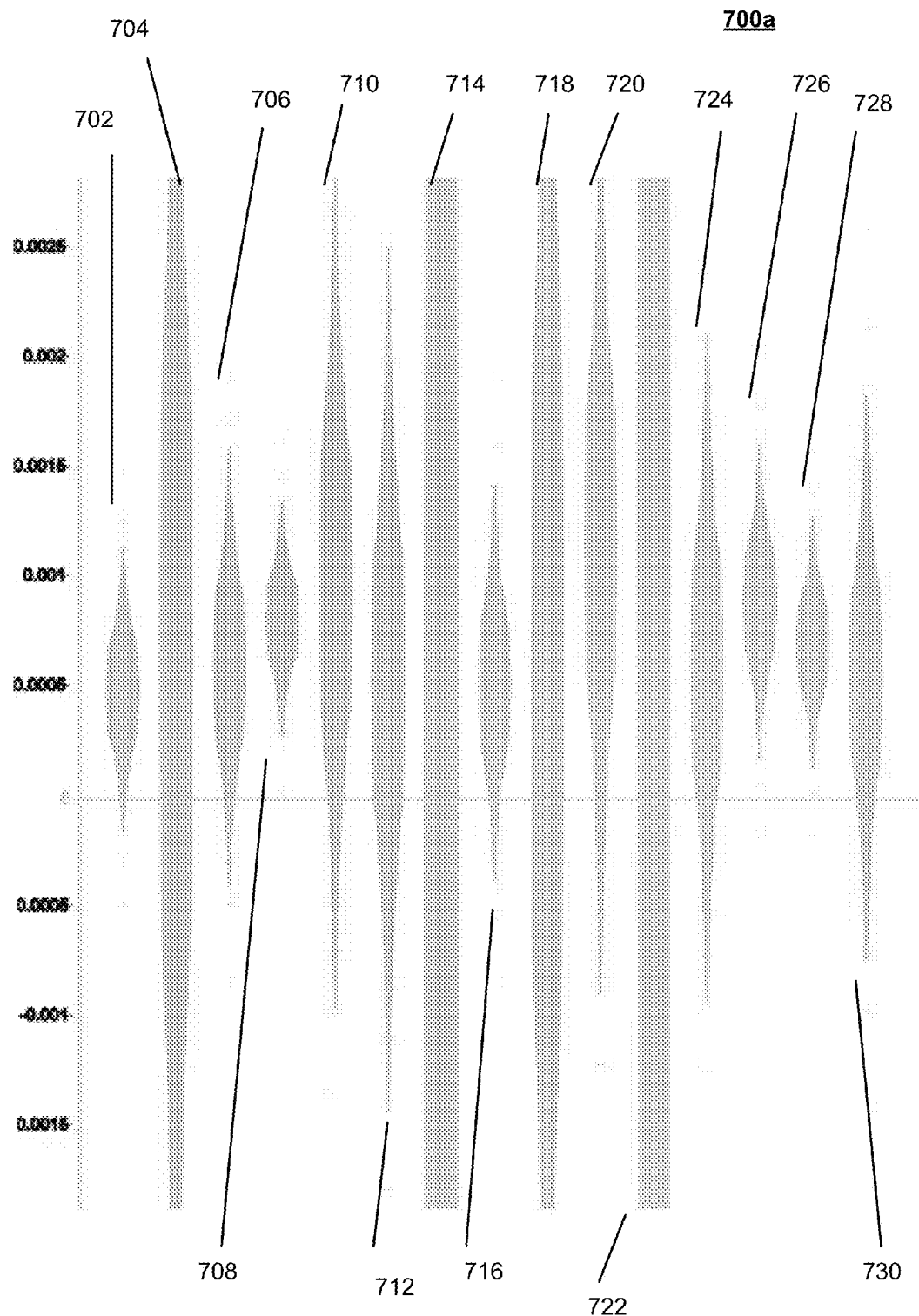
FIG. 7 depicts example variations of visualizations generated in accordance with the example system of FIG. 1.

FIG. 7 depicts example variations of visualizations generated in accordance with the example system of FIG. 1. As shown in FIG. 7a, a box-confidence plot is depicted drawn in full black. As shown in FIG. 7a, gradient confidence intervals may be depicted as tapered shapes drawn in full black, as shown in example visualizations 702, 704, 706, 708, 710, 712, 714, 716, 718, 720, 722, 724, 726, 728, and 730.

Figure 7B:
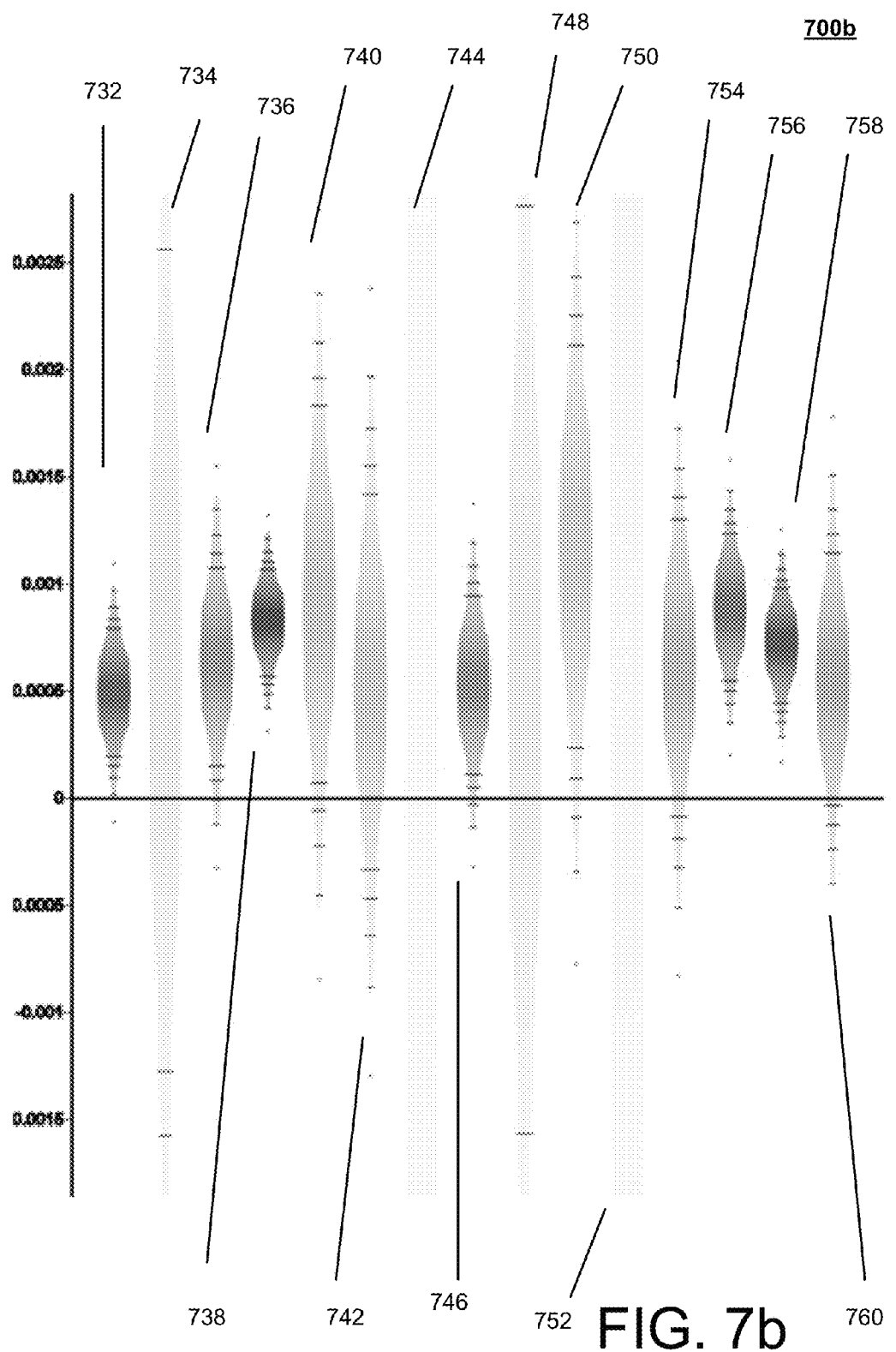

As shown in FIG. 7b, the same shape is depicted with the color modulation from FIG. 6. As shown in FIG. 7b, gradient confidence intervals may be depicted that become darker as the region converges, with a tapered shape, as shown in example visualizations 732, 734, 736, 738, 740, 742, 744, 746, 748, 750, 752, 754, 756, 758, and 760.

Thus, FIGS. 6 and 7 depict several potential combinations of different example visualization techniques discussed herein. The combinations of visualizations depicted in FIGS. 6 and 7 may reduce to visualizations similar to bar charts as they converge, and may easily be used with zooming and smooth animation. The adjusted gradient variation may reduce the impact of a thick black area near the center, and may reduce the salience of uncertain regions.

A confidence interval may suggest the breadth of ranges that it can display by placing one tick at the center, and additional end-caps at the ends of the interval. Unfortunately, if these three markers are not visible on screen, users may not be able to determine where on the distribution their current value can be found. As shown below, 'ribs' may be added to the gradients to indicate confidence intervals every 10%. These ribs may help readers to stay oriented within the bar.

All of these variations may reduce to a visualization much like a bar chart, with a small thick area at the estimated value. All of these variations may work in an interface that includes zooming, as it may be acceptable for a bar to be taller than the screen. Further, all of these variations change smoothly as data shrinks; thus, they all may allow smooth animation.

Figure 8B:
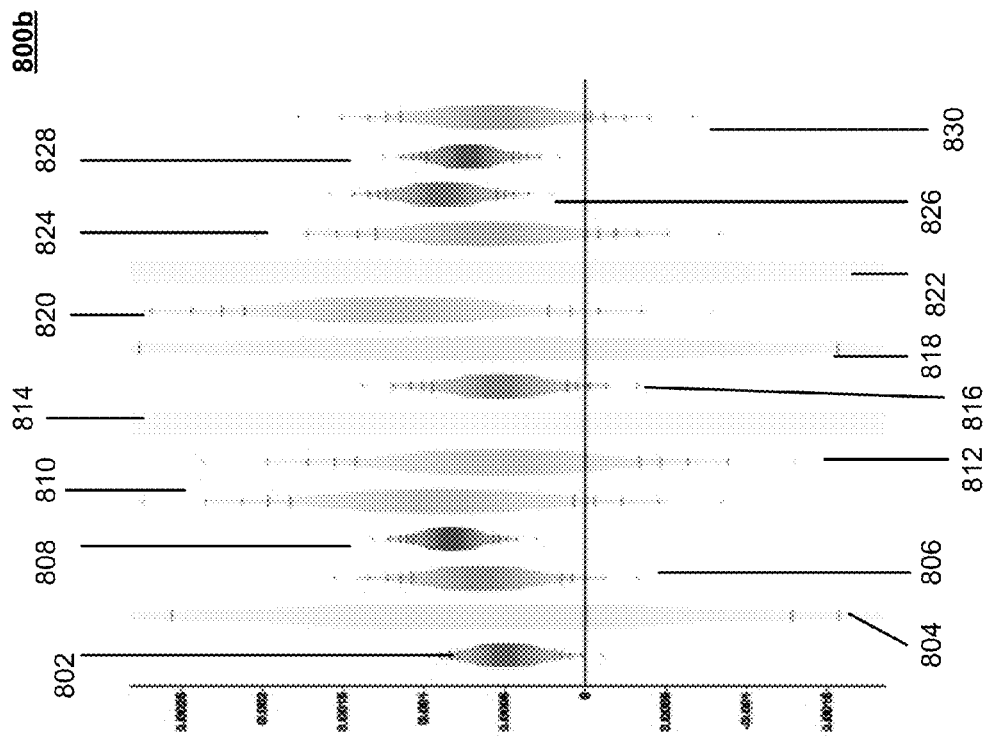
FIG. 8 depicts example visualizations generated in accordance with the example system of FIG. 1, as estimates converge over time.
Figure 8A:
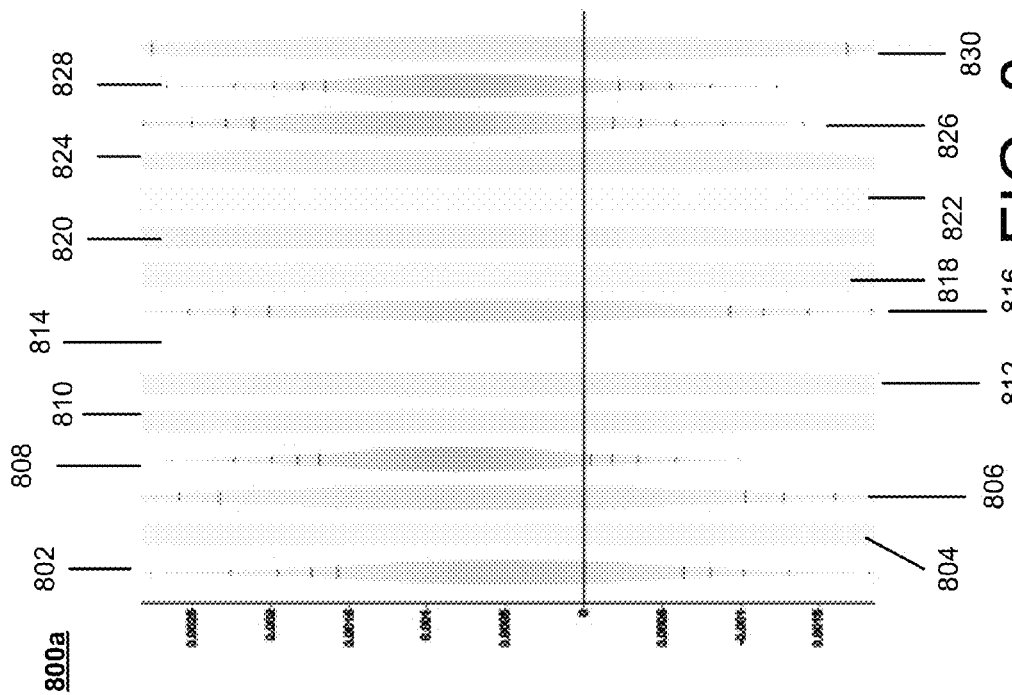
Figure 8C:
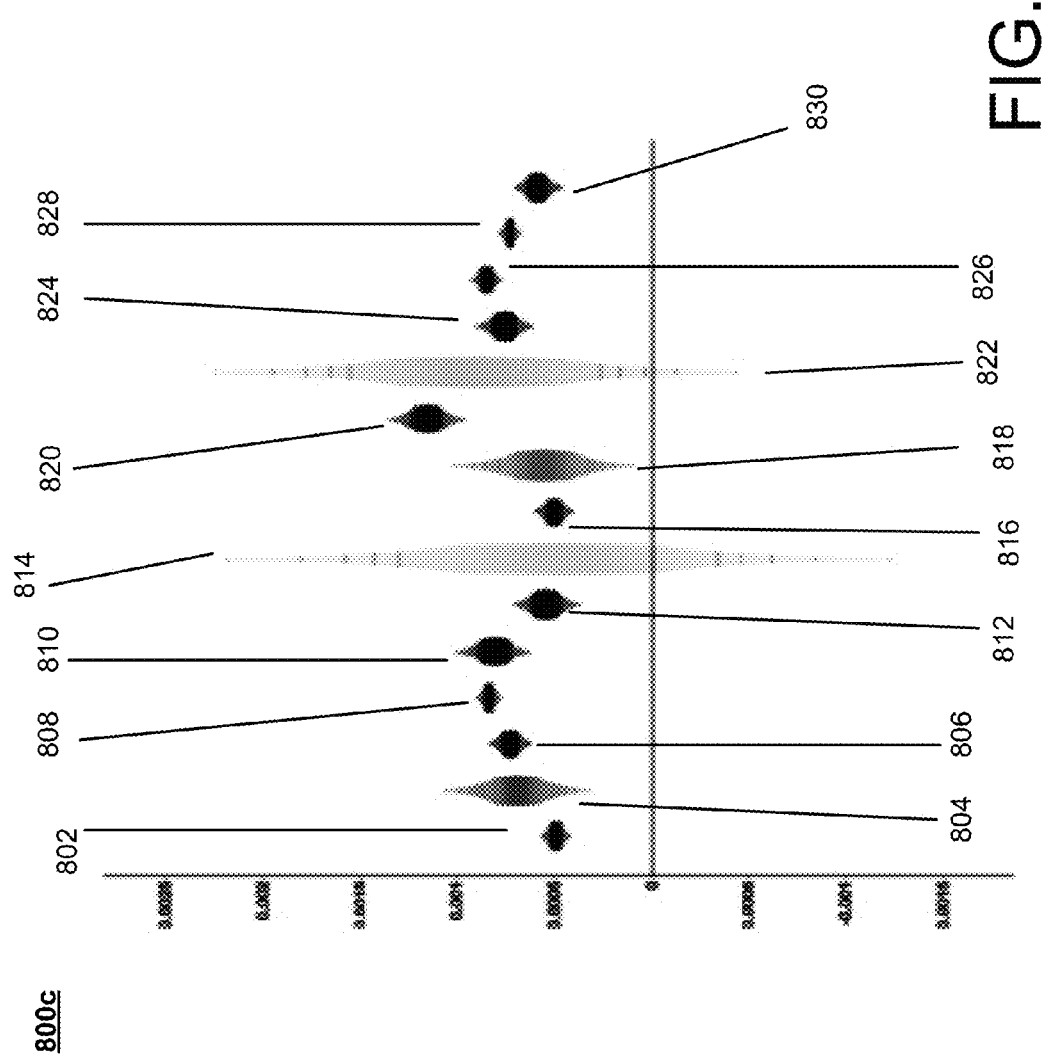

FIG. 8 depicts example visualizations 800 generated in accordance with the example system of FIG. 1, as estimates converge over time. FIGS. 8a, 8b, and 8c illustrate example tinted, shaped representations of the same query at three different time intervals. As shown in FIG. 8a, gradient confidence intervals may be depicted that become darker as the region converges, with a tapered shape, as shown in example visualizations 802, 804, 806, 808, 810, 812, 814, 816, 818, 820, 822, 824, 826, 828, and 830. As shown in FIG. 8a, tick marks (e.g., graphic bars 160) may annotate the visualizations, for example, to depict confidence interval bounds. FIG. 8a illustrates the visualizations at a time when all estimates are uncertain. FIG. 8b illustrates the visualizations at a time when several estimates (e.g., for visualizations 802, 808, 816, 826, 828, and 830) have largely converged, and FIG. 8c illustrates the visualizations at a time when many estimates (e.g., for visualizations 802, 804, 806, 808, 810, 812, 816, 818, 820, 824, 828, and 830) are close to convergence.

Example techniques discussed herein may provide a probability density comparison tool that may visualize a user expectation that one value will be higher than another, and a certainty associated with this comparison. By relaxing the desire of resemblance to a bar chart, other techniques may be used for providing visualizations for users to directly compare two (or more) distributions. For example, the relative probabilities of values may be analyzed. Thus, when computation starts, a user may observe that 'UA' is 70% likely to be the highest value, while 'AA' is 30% likely to be the highest value. As more data is processed, the user may observe probability distribution changes, until the probability for one value to be largest finally converges to (close to) 1. Such approaches may be extended to handle total ordering, as well as the magnitude of difference (e.g., "What is the probability that X is 10 units larger than Y?").

According to an example embodiment, these direct comparisons may be determined via a convolution of the underlying value-probability distributions. For example, this may be illustrated for a scenario of comparing two aggregate values $V_1$ and $V_2$. For example, $D_1$ and $D_2$ may denote their corresponding cumulative probability distributions, which may be defined as follows: let $D_1(x)$ be the smallest value t such that the probability that $V_1$ is larger than t is greater or equal to x (with $D_2(x)$ being defined similarly). Thus, when x is 0.025, $D_1$ returns the lower bound of the 95% confidence interval, and when x is 0.975, $D_1$ returns the upper bound.

A discrete approximation of the convolution of $D_1$ and $D_2$ may then be determined to quickly estimate the probability that $V_1 > V_2$, by "sampling" $D_1$ and $D_2$ at periodic intervals and measuring for which fraction of all point-pairs it holds that $D_1 > D_2$. This example technique thus approximates the probability with which one distribution will return a larger value than the other across all combinations of discrete intervals.

Figure 9:
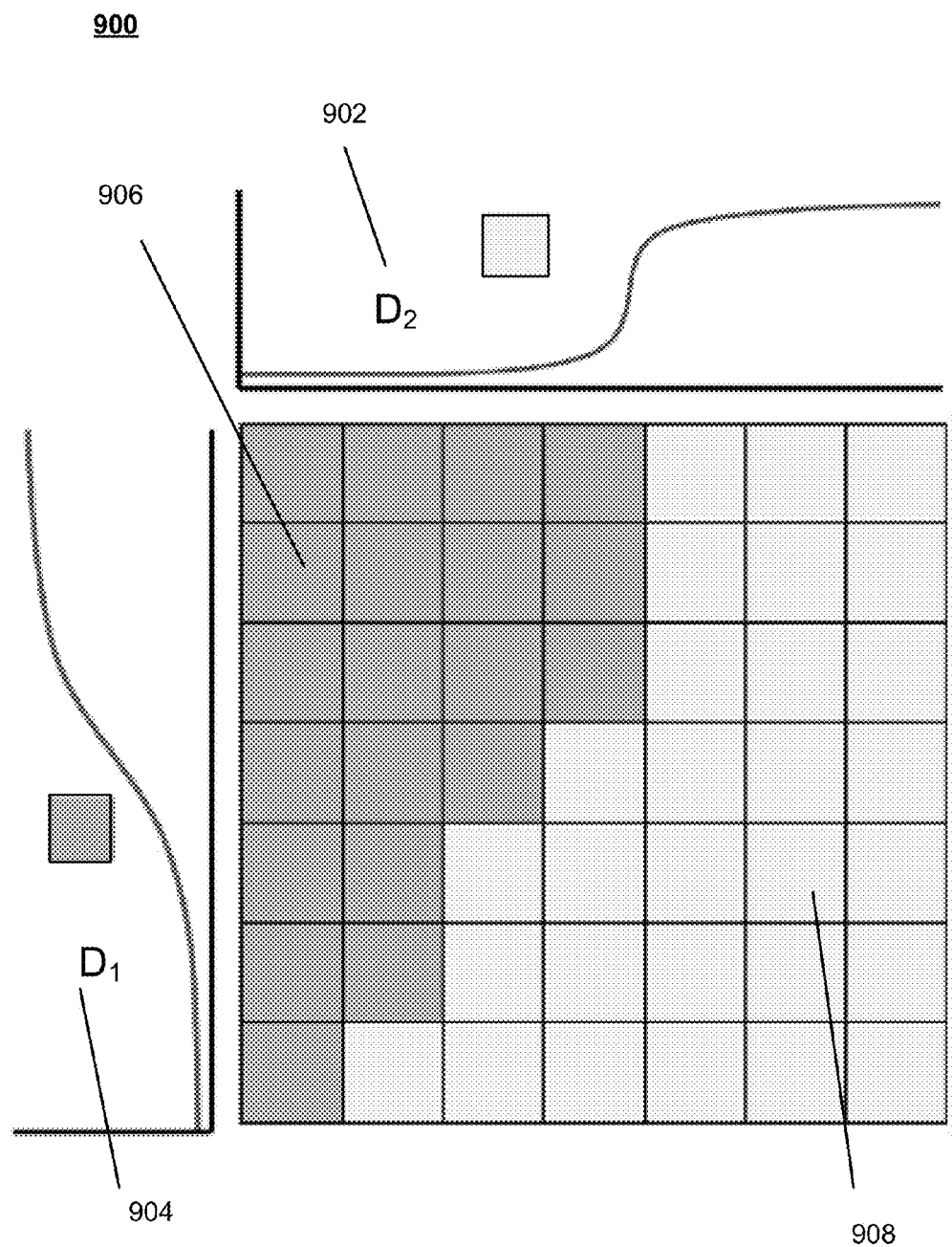
FIG. 9 depicts a shaded block diagram illustrating convolving distributions.

FIG. 9 depicts a shaded block diagram 900 illustrating convolving distributions. As shown in FIG. 9, cells in which a convolving distribution $D_1$ (902) is greater than a convolving distribution $D_2$ (904) may be depicted with red cells (shown as dark gray cells 906 in FIG. 9), and cells in which the convolving distribution $D_1$ is less than the convolving distribution $D_2$ may be depicted with blue cells (shown as light gray cells 908 in FIG. 9). As shown in FIG. 9, $D_1$ is greater in 20 cases (i.e., 40.8%), and $D_2$ is greater in 29 cases (59.2%).

As shown in FIG. 9, values of $r_{1,2}$ and $r_{2,1}$ may sum to a value at or below one. According to example embodiments, the values $r_{1,2}$, $r_{2,1}$ and the remainder $1 - r_{1,2} - r_{2,1}$ may be represented together as a bar chart or pie chart. That chart may indicate the chances that one distribution will result in a higher value than the other. Users may decide what level of certainty is sufficient for them to proceed with their calculations.

According to an example embodiment, this equation may be extended to determine the maximum value of arbitrarily many distributions, by searching for the maximum value of each possible combination of the multiple distributions, at a substantial computational cost.

According to an example embodiment, the outputs of these computations may be presented as miniature pie charts. These pie charts may indicate the probabilities that particular bars will reach a highest value.

Figure 10:
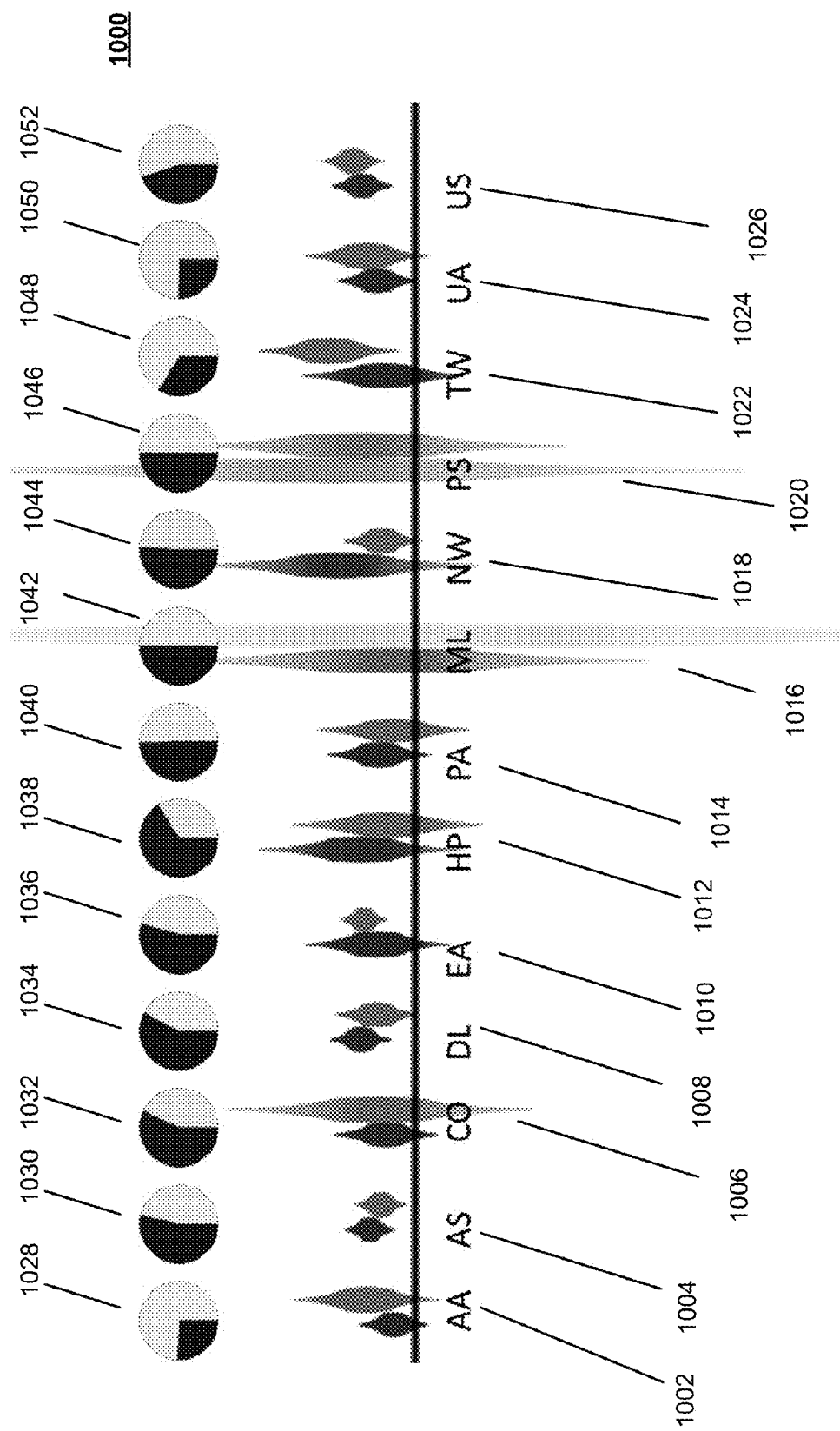
FIG. 10 illustrates example visualizations of comparisons of probabilities of flight delays.
Figure 11A:
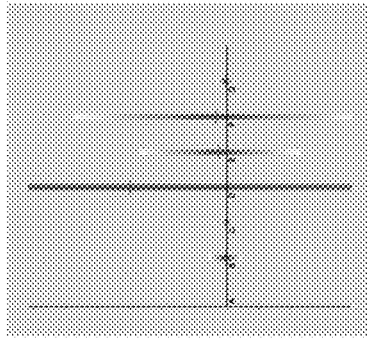
FIG. 11 illustrates example visualizations converging over temporal intervals.
Figure 11B:
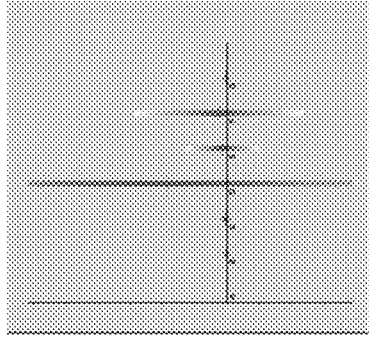
Figure 11C:
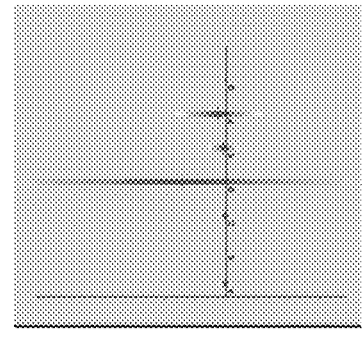
Figure 11D:
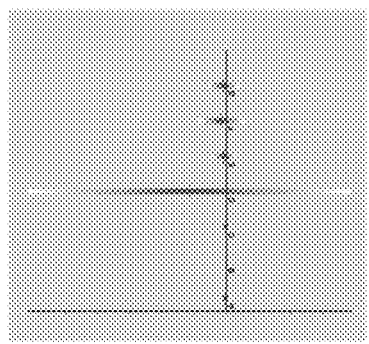
Figure 11E:
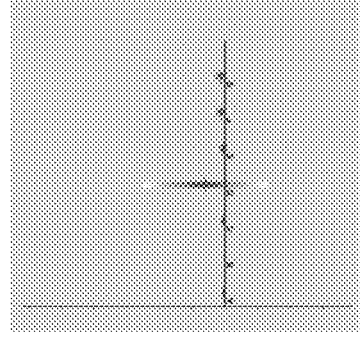
Figure 11F:
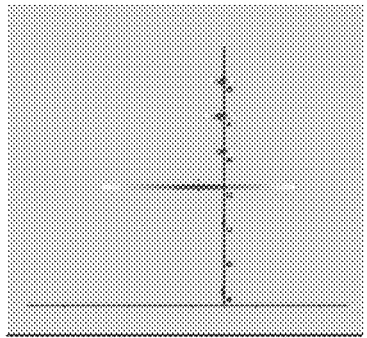
Figure 11G:
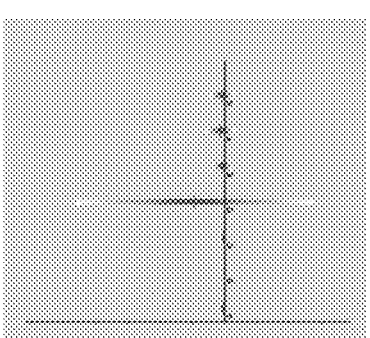
Figure 11H:
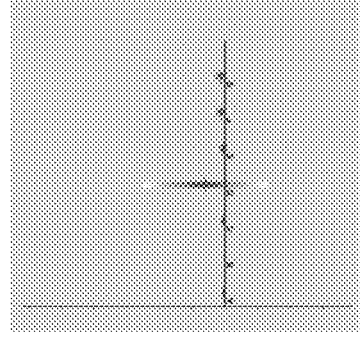

FIG. 10 illustrates example visualizations 1000 of comparisons of probabilities of flight delays. As shown in FIG. 10, comparisons of delay of flights by airline may be illustrated for November (left bar in each airline visualization, black shading in pie charts) to June (right bar in each airline visualization, gray shading in pie charts) in a clustered bar chart. For example, pairwise tapered bars are illustrated for example airlines 'AA' 1002, 'AS' 1004, 'CO' 1006, 'DL' 1008, 'EA' 1010, 'HP' 1012, 'PA' 1014, 'ML' 1016, 'NW' 1018, 'PS' 1020, 'TW' 1022, 'UA' 1024, and 'US' 1026. Miniature pie charts 1028, 1030, 1032, 1034, 1036, 1038, 1040, 1042, 1044, 1046, 1048, 1050, and 1052 for each respective airline indicate the probability that a flight will be delayed. As discussed above, these pie charts may indicate the chances that a particular tapered bar will reach a highest value (e.g., representing a comparison of the pairwise columns for each airline). Pairs that have not yet converged (e.g., 'ML' 1016) may be difficult to predict, but the example estimator may determine advantageous predictions for pairs that have converged (or are close to convergence).

According to an example embodiment, users may manually select pairs of columns for comparison.

FIG. 11 illustrates example visualizations converging over temporal intervals. FIGS. 11a-11h depict a group of visualizations converging over eight temporal intervals, in accordance with example embodiments discussed above.

Figures 12A, 12B, 12C, 12D, 12E, 12F:
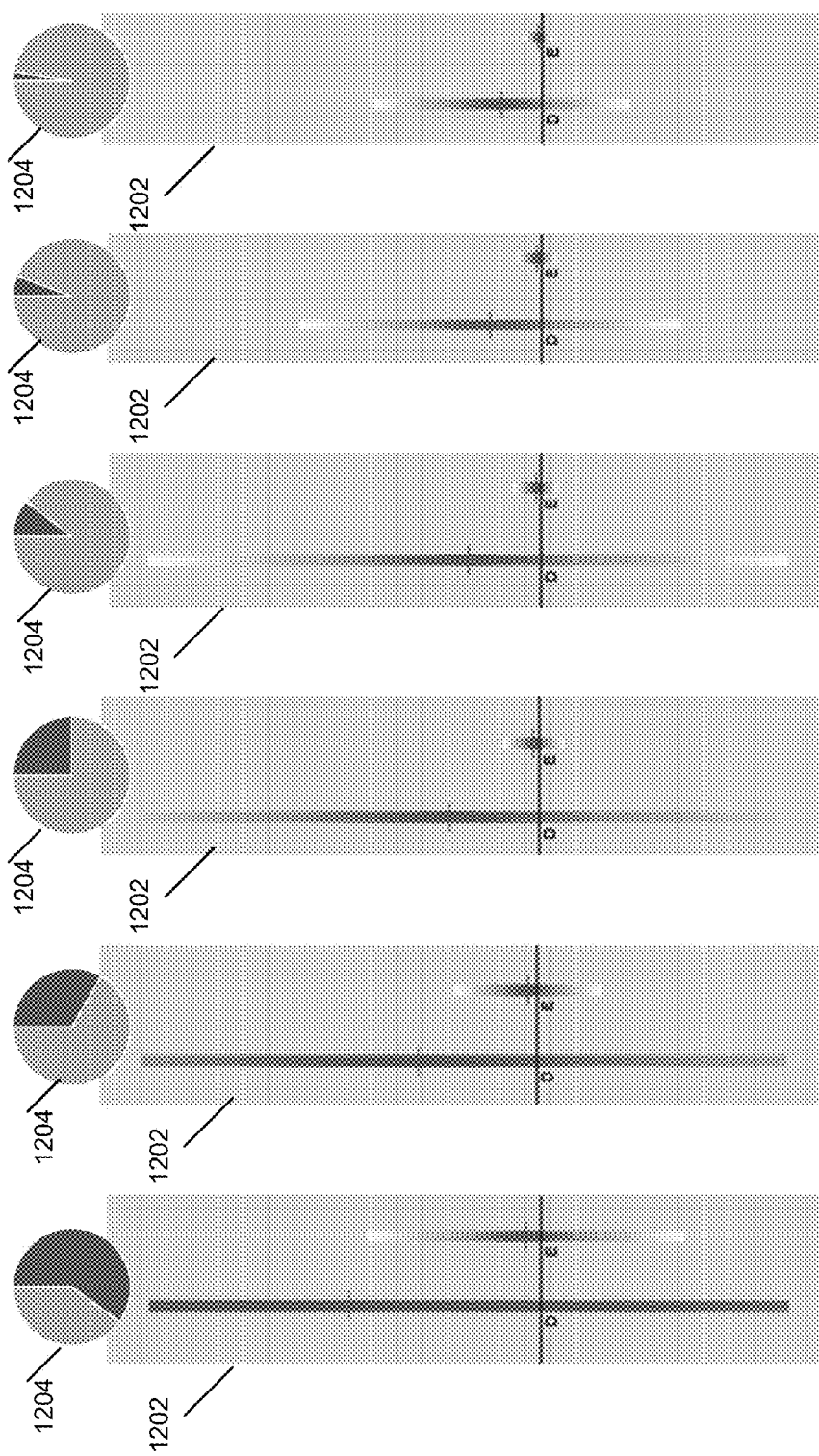
FIG. 12 illustrates example visualizations converging over temporal intervals with visualization comparison objects.

FIG. 12 illustrates example visualizations converging over temporal intervals with visualization comparison objects. FIGS. 12a-12f depict a pair of visualizations 1202 converging over six temporal intervals, with visualization comparison objects 1204, in accordance with example embodiments discussed above. As shown in FIGS. 12-12f, the visualization comparison objects 1204 are illustrated as miniature pie charts; however, one skilled in the art of data processing will understand that the visualization comparison objects 1204 may be depicted as bar charts, or as any other visualization object that may illustrate comparisons.

Example techniques discussed herein may thus provide different visualizations that may indicate partial results of incremental computation.

Example techniques discussed herein further provide a tool to enable a user to predict which value is likely to turn out to be a greater value. For example, these tools may help users interact with dynamically-changing confidence intervals as values shift.

One skilled in the art of data processing will understand that the example techniques discussed herein may be applicable to other forms of uncertainty, without departing from the spirit of the discussions herein.

One skilled in the art of data processing will appreciate that there are many ways of determining visualizations of uncertainty, without departing from the spirit of the discussion herein.

Customer privacy and confidentiality have been ongoing considerations in data processing environments for many years. Thus, example techniques for visualization of changing confidence intervals may use user input and/or data provided by users who have provided permission via one or more subscription agreements (e.g., "Terms of Service" (TOS) agreements) with associated applications or services associated with the visualizations. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them. Implementations may implemented as a computer program embodied in a propagated signal or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code on a machine usable or machine readable storage device. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
  at least one hardware device processor; and
  at least one machine readable storage device storing instructions that, when executed, cause one or more of the at least one hardware device processor to:
    iteratively obtain a plurality of incremental query results and a plurality of confidence interval values associated with respective ones of the incremental query results, each respective one of the incremental query results generated as a respective, temporally progressively generated part of an answer to an initial query, the respective incremental query results representing respective incremental results of a plurality of incremental queries operating on temporally progressively larger samples from a database;
    iteratively determine a plurality of visualization shape objects indicating uncertainty values, based on mapping values of respective ones of the incremental query results and confidence interval values to points in the associated ones of the visualization shape objects, the uncertainty values visualized based on proportional shapes of the visualization shape objects;
    determine at least one visualization comparison object representing a comparison of a plurality of distributions associated with the obtained incremental query results and confidence interval values; and iteratively display the plurality of visualization shape objects and the at least one visualization comparison object.

2. The system of claim 1, wherein the instructions, when executed, cause the one or more of the at least one hardware device processor to:

determine incremental groups of the plurality of incremental query results and associated confidence interval values, based on a plurality of temporal intervals associated with incremental convergence of the plurality of incremental query results, wherein determining the plurality of visualization shape objects includes determining incremental sets of the visualization shape objects indicating uncertainty values, based on mapping values of respective ones of the incremental groups to points in the associated ones of the incremental sets, the uncertainty values visualized based on proportional shapes of the visualization shape objects, wherein determining the at least one visualization comparison object includes determining incremental instances of the at least one visualization comparison object representing the comparison of the plurality of distributions associated with the obtained incremental query results and confidence interval values, based on the incremental sets, wherein iteratively displaying includes incrementally displaying of the incremental sets of the plurality of incremental query results, based on the plurality of temporal intervals associated with the incremental convergence of the plurality of incremental query results.

3. The system of claim 1, wherein the instructions, when executed, cause the one or more of the at least one hardware device processor to:

determine shaded gradient visualization fill associated with the visualization shape objects, the shaded gradient visualization fill indicating the uncertainty values, based on mapping values of respective ones of the incremental query results and confidence interval values to points in the associated ones of the visualization shape objects.

4. The system of claim 3, wherein:

determining the shaded gradient visualization fill includes determining a progressively darker gradient fill as points in respective regions converge to final values.

5. The system of claim 1, wherein:

determining the at least one visualization comparison object includes determining at least one visualization comparison object based on determining one or more probabilities that a first distribution final value is higher than a second distribution final value.

6. The system of claim 1, wherein:

the at least one visualization comparison object includes one or more of:
 a pie chart representing a comparison of a plurality of distributions associated with the obtained incremental query results and confidence interval values, or
 a bar chart representing a comparison of a plurality of distributions associated with the obtained incremental query results and confidence interval values.

7. The system of claim 1, wherein the instructions, when executed, cause the one or more of the at least one hardware device processor to:

determine a plurality of graphic bars indicating locations of confidence interval bounds associated with the obtained confidence interval values, based on mapping the graphic bars to points in the respective visualization shape objects associated with the respective obtained confidence interval values.

8. The system of claim 1, wherein:

the visualization shape objects include rectangular visualization shape objects that include modulated levels of colored fill and a plurality of graphic bars indicating locations of confidence interval bounds associated with the obtained confidence interval values, based on mapping the graphic bars to points in the respective visualization shape objects associated with the respective obtained confidence interval values.

9. The system of claim 1, wherein:

the visualization shape objects include one or more of:
 rectangular visualization shape objects that include modulated levels of a first color fill on a second color, or
 tapered visualization shape objects that include tapered widths proportional to respective probabilities associated with the obtained confidence interval values.

10. The system of claim 9, wherein:

the respective probabilities associated with the obtained confidence interval values represent probabilities that respective points included in the visualization shape objects include actual final values of query results, wherein the plurality of distributions associated with the obtained incremental query results are associated with respective cumulative density functions.

11. The system of claim 9, wherein:

the tapered visualization shape objects include one or more of:
 tapered widths proportional to respective probabilities associated with the obtained confidence interval values, with a single color fill,
 tapered widths proportional to respective probabilities associated with the obtained confidence interval values, with progressively lighter color fill extending from respective midpoints of the tapered visualization shape objects toward endpoints of the tapered visualization shape objects,
 tapered widths proportional to respective probabilities associated with the obtained confidence interval values, with progressively darker color fill extending from respective midpoints of the tapered visualization shape objects toward endpoints of the tapered visualization shape objects,
 tapered widths proportional to respective probabilities associated with the obtained confidence interval values, with annotated graphic bars indicating locations of confidence interval bounds associated with the obtained confidence interval values, the annotated graphic bars including widths associated with the tapered widths of the tapered visualization shape objects, at the respective locations of the confidence interval bounds, or
 tapered widths proportional to respective probabilities associated with the obtained confidence interval values, with shaded gradient color fill.

12. A method comprising:

iteratively obtaining a plurality of incremental query results and a plurality of confidence interval values associated with respective ones of the incremental query results, each respective one of the incremental query results generated as a respective, temporally progressively generated part of an answer to an initial query, the respective incremental query results representing respective incremental results of a plurality of incremental queries operating on temporally progressively larger samples from a database;

determining, via a device processor, incremental groups of the plurality of incremental query results and associated confidence interval values, based on a plurality of temporal intervals associated with incremental convergence of the plurality of incremental query results;

determining incremental sets of visualization shape objects indicating uncertainty values, based on mapping values of respective ones of the incremental groups to points in the associated ones of the incremental sets, the uncertainty values visualized based on proportional shapes of the visualization shape objects; and iteratively displaying the incremental sets of visualizations shape objects, as the incremental sets of visualization shape objects are determined.

13. The method of claim 12, further comprising:

initiating incremental display of the incremental sets of visualization shape objects.

14. The method of claim 12, further comprising:

determining incremental instances of at least one visualization comparison object representing a comparison of a plurality of distributions associated with the obtained incremental query results and confidence interval values, based on the incremental sets.

15. The method of claim 12, wherein:

the plurality of distributions associated with the obtained incremental query results are associated with respective cumulative density functions.

16. A method comprising:

iteratively obtaining a plurality of incremental query results and a plurality of confidence interval values associated with respective ones of the incremental query results, each respective one of the incremental query results generated as a respective, temporally progressively generated part of an answer to an initial query, the respective incremental query results representing respective incremental results of a plurality of incremental queries operating on temporally progressively larger samples from a database;

determining, via a device processor, at least one visualization comparison object representing a comparison of a plurality of distributions associated with the obtained incremental query results and confidence interval values; and displaying the at least one visualization comparison object.

17. The method of claim 16, further comprising:

initiating display of the at least one visualization comparison object.

18. The method of claim 16, wherein:

determining the at least one visualization comparison object includes determining one or more of:

a pie chart indicating a probability that a first distribution final value is higher than a second distribution final value, or a bar chart indicating a probability that a first distribution final value is higher than a second distribution final value.

19. The method of claim 16, wherein determining the at least one visualization comparison object includes determining one or more probabilities that a first distribution final value is higher than a second distribution final value.

20. The method of claim 16, further comprising:

determining, via the device processor, incremental groups of the plurality of incremental query results and associated confidence interval values, based on a plurality of temporal intervals associated with incremental convergence of the plurality of incremental query results;

determining incremental instances of the at least one visualization comparison object representing the comparison of the plurality of distributions associated with the obtained incremental query results and confidence interval values, based on the incremental sets; and initiating incremental display of the incremental instances of the at least one visualization comparison object.

\* \* \* \* \*